US012444381B2

(12) United States Patent
Tian et al.

(10) Patent No.: US 12,444,381 B2
(45) Date of Patent: Oct. 14, 2025

(54) METHOD FOR DRIVING DISPLAY PANEL THAT DURING A BLANKING TIME PHASE LOADS A COMPENSATION VOLTAGE TO EACH DATA LINE, DISPLAY DRIVE CIRCUIT, AND DISPLAY DEVICE

(71) Applicants: Beijing BOE Display Technology Co., Ltd., Beijing (CN); BOE Technology Group Co., Ltd., Beijing (CN)

(72) Inventors: Yuhang Tian, Beijing (CN); Yanping Liao, Beijing (CN); Dongchuan Chen, Beijing (CN); Shulin Yao, Beijing (CN); Yingmeng Miao, Beijing (CN); Yinlong Zhang, Beijing (CN); Pengfei Hu, Beijing (CN); Wenpeng Ma, Beijing (CN); Zheng Zhang, Beijing (CN); Jiantao Liu, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/292,812

(22) PCT Filed: Sep. 29, 2021

(86) PCT No.: PCT/CN2021/121618

§ 371 (c)(1),
(2) Date: Jan. 26, 2024

(87) PCT Pub. No.: WO2023/050127

PCT Pub. Date: Apr. 6, 2023

(65) Prior Publication Data

US 2024/0363084 A1 Oct. 31, 2024

(51) Int. Cl.
*G09G 3/36* (2006.01)

(52) U.S. Cl.
CPC ......... *G09G 3/3607* (2013.01); *G09G 3/3614* (2013.01); *G09G 2310/08* (2013.01); *G09G 2320/02* (2013.01); *G09G 2340/0435* (2013.01)

(58) Field of Classification Search
None
See application file for complete search history.

(56) References Cited

U.S. PATENT DOCUMENTS

2003/0058232 A1 3/2003 Washio et al.
2009/0027322 A1* 1/2009 Hosotani .............. G09G 3/3688 345/87

(Continued)

FOREIGN PATENT DOCUMENTS

CN 1420482 A 5/2003
CN 102063882 A 5/2011

(Continued)

OTHER PUBLICATIONS

International Search Report, mailed Jun. 9, 2022, from PCT International Application PCT/CN2021/121618, 6 pages.

(Continued)

*Primary Examiner* — Kirk W Hermann
(74) *Attorney, Agent, or Firm* — Workman Nydegger

(57) ABSTRACT

The method includes, during a data refresh stage of at least one display frame, loading a gate turn-on voltage to a gate line, and loading, on each data line, a data voltage of an image to be displayed, so that each sub-pixel inputs a corresponding data voltage, and during a blanking time period, loading a gate turn-off voltage to a gate line, and loading a compensation voltage to each data line. When a data voltage in a sub-pixel connected to a data line is greater than a common electrode voltage, a compensation voltage is less than the data voltage in the sub-pixel connected to the data line, and/or when the data voltage in the sub-pixel is (Continued)

less than the common electrode voltage, the compensation voltage is greater than the data voltage in the sub-pixel.

17 Claims, 14 Drawing Sheets

(56) References Cited

U.S. PATENT DOCUMENTS

| | | | | |
|---|---|---|---|---|
| 2011/0109605 | A1 | 5/2011 | Omori et al. | |
| 2011/0279435 | A1 | 11/2011 | Tsai et al. | |
| 2015/0022747 | A1 | 1/2015 | Hong et al. | |
| 2016/0189617 | A1 | 6/2016 | Park | |
| 2018/0012556 | A1* | 1/2018 | Hsu | G09G 3/3677 |
| 2019/0237010 | A1 | 8/2019 | Lin et al. | |
| 2020/0105212 | A1* | 4/2020 | Kim | G09G 3/3607 |
| 2020/0226978 | A1 | 7/2020 | Lin et al. | |
| 2021/0118378 | A1* | 4/2021 | Son | G09G 3/006 |
| 2021/0201800 | A1 | 7/2021 | Ahn et al. | |
| 2022/0148487 | A1 | 5/2022 | Xue et al. | |
| 2022/0199049 | A1 | 6/2022 | Hua et al. | |
| 2022/0262295 | A1* | 8/2022 | Kim | G09G 3/2007 |
| 2023/0206842 | A1* | 6/2023 | Park | G09G 3/3233 345/212 |

FOREIGN PATENT DOCUMENTS

| | | | | |
|---|---|---|---|---|
| CN | 105741733 | A | | 7/2016 |
| CN | 109410832 | A | | 3/2019 |
| CN | 110047418 | A | | 7/2019 |
| CN | 111435587 | A | | 7/2020 |
| CN | 112530351 | A | | 3/2021 |
| CN | 112687234 | A | | 4/2021 |
| CN | 113129830 | A | | 7/2021 |
| CN | 113178157 | A | | 7/2021 |
| JP | 2004151327 | A | | 5/2004 |
| KR | 20080048881 | A | | 6/2008 |
| KR | 20150011173 | A | | 1/2015 |
| KR | 20200080783 | A | * | 7/2020 |

OTHER PUBLICATIONS

Kim et al., "Content-Centric Energy Management of Mobile Displays", IEEE Transactions on Mobile Computing, vol. 15, Issue 8, Sep. 25, 2015, pp. 1925-1938.

* cited by examiner

METHOD FOR DRIVING DISPLAY PANEL THAT DURING A BLANKING TIME PHASE LOADS A COMPENSATION VOLTAGE TO EACH DATA LINE, DISPLAY DRIVE CIRCUIT, AND DISPLAY DEVICE

CROSS-REFERENCE TO RELATED APPLICATION

This application is a national phase entry under 35 U.S.C § 371 of International Application No. PCT/CN2021/121618, filed on Sep. 29, 2021, the entire content of which is incorporated herein by reference.

TECHNICAL FIELD

The present disclosure relates to the field of display technology, and in particular to a method for driving a display panel, a display drive circuit and a display device.

BACKGROUND

Displays such as a liquid crystal display (LCD) and an organic light-emitting diode (OLED) generally include a plurality of pixels. Each pixel may include: a red sub-pixel, a green sub-pixel and a blue sub-pixel. By controlling display data corresponding to each sub-pixel, display brightness of each sub-pixel is controlled, so as to display a color image by mixing to-be-required and displayed colors.

SUMMARY

Embodiments of the present disclosure provide a method for driving a display panel, where the display panel works in a plurality of continuous display frames, and each display frame includes a data refresh phase and a blanking time phase; and the method includes:

in the data refresh phase of at least one of the plurality of continuous display frames, loading a gate-on voltage to a gate line in the display panel, and loading a data voltage of a to-be-displayed image to each data line, to input a corresponding data voltage to each sub-pixel; and in the blanking time phase of at least one display frame, loading a gate-off voltage to the gate line in the display panel, and loading a compensation voltage to each data line;

where when the data voltage in the sub-pixel connected with the data line is greater than a common electrode voltage, the compensation voltage loaded on the data line is lower than the data voltage in the sub-pixel connected with the data line; and/or when the data voltage in the sub-pixel connected with the data line is lower than a common electrode voltage, the compensation voltage loaded on the data line is greater than the data voltage in the sub-pixel connected with the data line.

In some embodiments, the compensation voltage is loaded throughout the blanking time phase of the at least one display frame.

In some embodiments, the display panel adopts a column inversion method or a frame inversion method; the compensation voltage includes a first sub-compensation voltage;

for each data line, a polarity corresponding to the first sub-compensation voltage loaded on the data line is opposite to a polarity corresponding to the sub-pixel connected with the data line.

In some embodiments, the display frame, in which the compensation voltage is loaded to each data line in the blanking time phase, has a first display frame and a second display frame;

the first display frame corresponds to a first refresh rate, and the second display frame corresponds to a second refresh rate; and the first refresh rate is greater than the second refresh rate; and a duration of the blanking time phase in the first display frame is shorter than a duration of the blanking time phase in the second display frame.

In some embodiments, the display frame, in which the compensation voltage is loaded to each data line in the blanking time phase, is defined as a set display frame; in two adjacent set display frames, for a same data line, the first sub-compensation voltage loaded to the data line in a previous set display frame and the common electrode voltage have a first difference therebetween, and the first sub-compensation voltage loaded to the data line in a next set display frame and the common electrode voltage have a second difference therebetween; and an absolute value of the first difference is equal to an absolute value of the second difference.

In some embodiments, the compensation voltage further includes a transition compensation voltage that appears before the first sub-compensation voltage;

for each data line, a polarity corresponding to the transition compensation voltage loaded on the data line is the same as the polarity corresponding to the sub-pixel connected with the data line.

In some embodiments, the display panel adopts a column inversion method or a frame inversion method; the compensation voltage includes a second sub-compensation voltage;

for each data line, a polarity corresponding to the second sub-compensation voltage loaded on the data line is the same as a polarity corresponding to the data voltage in the sub-pixel connected with the data line.

In some embodiments, the display frame, in which the compensation voltage is loaded to each data line in the blanking time phase, is defined as a set display frame;

part of the plurality of continuous display frames are the set display frames;

the display frames other than the set display frames among the plurality of continuous display frames are non-set display frames;

the non-set display frames include:

in the data refresh phase, loading the gate-on voltage to the gate line in the display panel, and loading the data voltage of the to-be-displayed image to each data line, to input the corresponding data voltage to each sub-pixel; and in the blanking time phase, loading the gate-off voltage to the gate line in the display panel, to enable each data line to be in a suspension joint state.

In some embodiments, at least one non-set display frame exists between two adjacent set display frames.

In some embodiments, a quantity of the non-set display frames between every two adjacent set display frames is the same.

In some embodiments, a gray scale corresponding to the compensation voltage loaded on each data line is the same.

In some embodiments, for each data line, the gray scale corresponding to the compensation voltage loaded on the data line is the same as a gray scale corresponding to one data voltage of the sub-pixel connected with the data line.

In some embodiments, the gray scale corresponding to the compensation voltage is determined by using the following formula:

$$VS11=(VA11+VA12)/2;$$

where, VS11 represents the gray scale corresponding to the compensation voltage, VA11 represents a maximum gray scale in a display frame selected from the plurality of continuous display frames, VA12 represents a minimum gray scale in the display frame selected from the plurality of continuous display frames, and VA11+VA12 is an even number.

In some embodiments, the gray scale corresponding to the compensation voltage is determined by using the following formula:

$$VS21=(VA21+VA22+1)/2;$$

where, VS21 represents the gray scale corresponding to the compensation voltage, VA21 represents a maximum gray scale in a display frame selected from the plurality of continuous display frames, VA22 represents a minimum gray scale in the display frame selected from the plurality of continuous display frames, and VA21+VA22 is an odd number.

In some embodiments, the loading the compensation voltage to each data line, includes: in the blanking time phase of a set display frame, selecting a display frame from the plurality of display frames, and for each data line, and loading a voltage of a gray scale, corresponding to a data voltage input into a row of sub-pixels of the display panel in the selected display frame, to the data line.

In some embodiments, the loading the compensation voltage to each data line, includes:

in the blanking time phase of the set display frame, selecting a display frame from the plurality of display frames, and for each data line, loading a voltage of a gray scale, corresponding to a data voltage input into a last row of sub-pixels of the display panel in the selected display frame, to the data line.

In some embodiments, the loading the compensation voltage to each data line, includes:

in the blanking time phase of a set display frame, selecting a display frame from the plurality of display frames, and for each data line, sequentially loading a voltage of a gray scale, corresponding to a data voltage input into the data line in the selected display frame, to the data line.

In some embodiments, the display frame selected from the plurality of display frames is one of a previous display frame adjacent to the set display frame and the set display frame.

Embodiments of the present disclosure provides a display drive circuit, where a display panel works in a plurality of continuous display frames, and each display frame includes a data refresh phase and a blanking time phase; and the display drive circuit is configured for:

in the data refresh phase of at least one of the plurality of continuous display frames, loading a gate-on voltage to a gate line in the display panel, and loading a data voltage of a to-be-displayed image to each data line, to input a corresponding data voltage to each sub-pixel;

in the blanking time phase of at least one display frame, loading a gate-off voltage to the gate line in the display panel, and loading a compensation voltage to each data line;

where when the data voltage in the sub-pixel connected with the data line is greater than a common electrode voltage, the compensation voltage loaded on the data line is lower than the data voltage in the sub-pixel connected with the data line;

when the data voltage in the sub-pixel connected with the data line is lower than a common electrode voltage, the compensation voltage loaded on the data line is greater than the data voltage in the sub-pixel connected with the data line.

Embodiments of the present disclosure provides a display device, including a display panel and a timing controller; where, the display panel includes a plurality of gate lines, a plurality of data lines, a source drive circuit, and a gate drive circuit; where, the source drive circuit is coupled to the plurality of data lines;

the gate drive circuit is coupled to the plurality of gate lines;

the timing controller is coupled to the source drive circuit and the gate drive circuit;

the timing controller is configured to: in a data refresh phase of at least one of a plurality of continuous display frames, input a first gate drive signal to the gate drive circuit, and input a first source drive signal to the source drive circuit; and in a blanking time phase of at least one display frame, input a second gate drive signal to the gate drive circuit, and input a second source drive signal to the source drive circuit;

the gate drive circuit is configured to load a gate-on voltage to a gate line in the display panel according to the first gate drive signal; and load a gate-off voltage to the gate line in the display panel according to the second gate drive signal; and the source drive circuit is configured to load a data voltage of a to-be-displayed image to each data line according to the first source drive signal, to input a corresponding data voltage to each sub-pixel; and load a compensation voltage to each data line according to the second source drive signal.

DETAILED DESCRIPTION

Figure 1A:
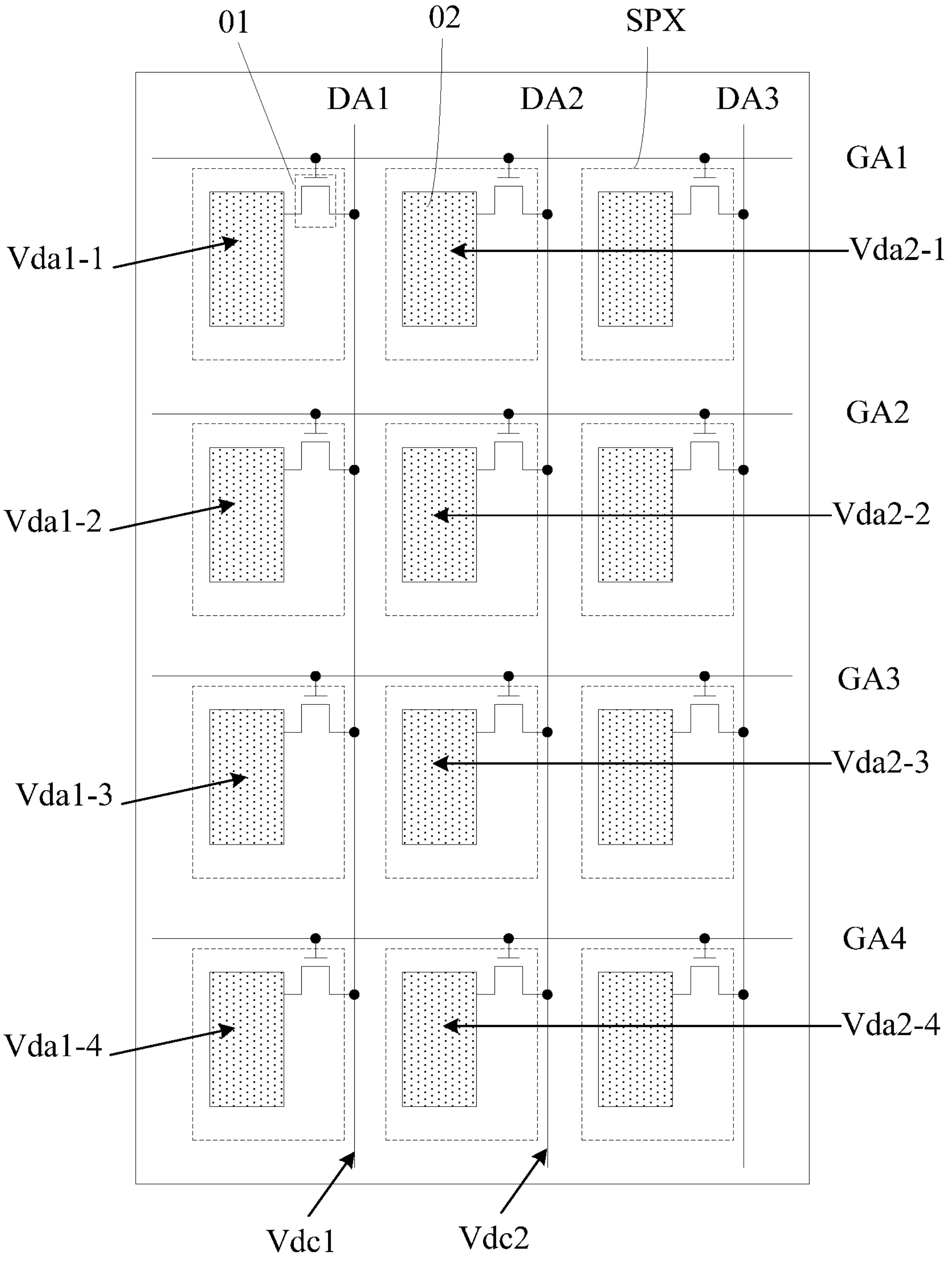
FIG. 1A is a schematic structural diagram of a display panel according to an embodiment of the present disclosure.

In order to make the purposes, technical solutions and advantages of embodiments of the present disclosure clearer, the technical solutions of the embodiments of the present disclosure will be clearly and completely described below in conjunction with the accompanying drawings of the embodiments of the present disclosure. Apparently, the described embodiments are some but not all of the embodiments of the present disclosure. In the case of no conflict, the embodiments in the present disclosure and the features in the embodiments can be combined with each other. Based on the described embodiments of the present disclosure, all other embodiments obtained by persons of ordinary skill in the art without creative effort fall within the protection scope of the present disclosure.

Unless otherwise defined, the technical terms or scientific terms used in the present disclosure shall have usual meanings understood by those skilled in the art to which the present disclosure belongs. "First", "second" and similar words used in the present disclosure do not indicate any order, quantity or importance, but are only used to distinguish different components. "Comprise" or "include" and similar words mean that elements or items appearing before the word include elements or items listed after the word and their equivalents, without excluding other elements or items. Words such as "connect" or "connected" are not limited to physical or mechanical connections, but may include electrical connections, whether direct or indirect.

It should be noted that a size and shape of each figure in the drawings do not reflect a true scale, but are only intended to illustrate the present disclosure. And the same or similar reference numerals denote the same or similar elements or elements having the same or similar functions throughout.

A current display frequency is generally 60 HZ, that is, a screen of a display is refreshed 60 times per second, so that the screen seen by human eyes is dynamic and smooth. However, in some application scenarios, in order to reduce power consumption of the display, it is necessary to reduce a frequency of the display, for example, reducing from 60 HZ to 30 HZ. In other scenarios, for example, when performing high-frequency games, it is necessary to increase a frequency of the display, for example, increasing from 60 HZ to 90 HZ or 120 HZ, so as to make the screen smoother. Therefore, in order to be suitable for different scenarios, the display needs to change the display frequency, that is, a dynamic frame rate display.

As shown in FIG. 1A, a display may include a plurality of pixels arranged in an array, a plurality of gate lines (such as GA1, GA2, GA3, GA4) and a plurality of data lines (such as DA1, DA2, DA3). Each pixel includes a plurality of sub-pixels. Exemplarily, a pixel may include a red sub-pixel(s), a green sub-pixel(s) and a blue sub-pixel(s), so that red, green and blue can be mixed to achieve color display. Alternatively, a pixel may also include a red sub-pixel(s), a green sub-pixel(s), a blue sub-pixel(s) and a white sub-pixel(s), so that red, green, blue and white can be mixed to realize color display. In practical applications, luminous colors of sub-pixels in the pixel can be designed and determined according to practical application environment, which is not limited herein.

Figure 2:
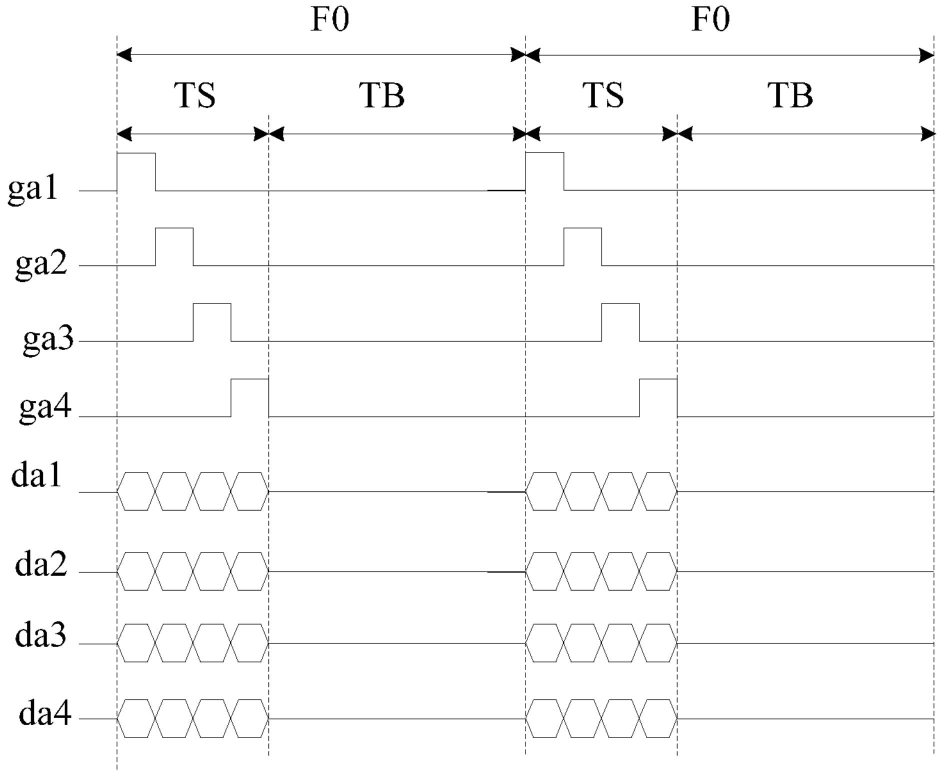
FIG. 2 is a signal timing diagram in a related disclosed embodiment.

As shown in FIG. 1A and FIG. 2, each sub-pixel includes a transistor 01 and a pixel electrode 02. Here, one row of sub-pixels corresponds to one gate line, and one column of sub-pixels corresponds to one data line. A gate of the transistor 01 is electrically connected with a corresponding gate line, a source of the transistor 01 is electrically connected with a corresponding data line, and a drain of the transistor 01 is electrically connected with the pixel electrode 02. It should be noted that a pixel array structure in the present disclosure can also be a double-gate structure, that is, two gate lines are arranged between two adjacent rows of pixels. This arrangement can reduce half of the data lines, that is, some adjacent columns of pixels have data lines therebetween, while some other adjacent columns of pixels do not have data lines therebetween. The specific arrangement structure of the pixels and the arrangement manner of the data lines and scanning lines are not limited herein. Moreover, a display frame F0 of the display may include a data refresh phase TS and a blanking time phase TB. In the data refresh phase TS, a signal ga1 is loaded to a gate line GA1, a signal ga2 is loaded to a gate line GA2, a signal ga3 is loaded to a gate line GA3, and a signal ga4 is loaded to a gate line GA4, and when a gate-on voltage (such as a voltage corresponding to a high level) exists among the signals ga1 to ga4, a corresponding transistor 01 can be controlled to be turned on. Moreover, when the gate-on voltage appears on the signal ga1, all the transistors 01 in a first row of sub-pixels can be controlled to be turned on, and a corresponding data voltage da1 is loaded to a data line DA1, a corresponding data voltage da2 is loaded to a data line DA2, and a corresponding data voltage da3 is loaded to a data line DA3, so that the corresponding data voltage is input to a pixel electrode 02 in the first row of sub-pixels. When the gate-on voltage appears on the signal ga2, all the transistors 01 in a second row of sub-pixels can be controlled to be turned on, a corresponding data voltage da1 is loaded to a data line DA1, a corresponding data voltage da2 is loaded to a data line DA2, and a corresponding data voltage da3 is loaded to a data line DA3, so that the corresponding data voltage is input to a pixel electrode 02 in the second row of sub-pixels. When the gate-on voltage appears on the signal ga3, all the transistors 01 in a third row of sub-pixels can be controlled to be turned on, a corresponding data voltage da1 is loaded to a data line DA1, a corresponding data voltage da2 is loaded to a data line DA2, and a corresponding data voltage da3 is loaded to a data line DA3, so that the corresponding data voltage is input to a pixel electrode 02 in the third row of sub-pixels. When the gate-on voltage appears on the signal ga4, all the transistors 01 in a fourth row of sub-pixels can be controlled to be turned on, a corresponding data voltage da1 is loaded to a data line DA1, a corresponding data voltage da2 is loaded to a data line DA2, and a corresponding data voltage da3 is loaded to a data line DA3, so that the corresponding data voltage is input to a pixel electrode 02 in the fourth row of sub-pixels. The rest of rows are deduced in the same way, and will not be repeated herein.

As shown in FIG. 1A and FIG. 2, in the blanking time phase TB, the signals ga1 to ga4 are all at a low level, and the transistor 01 in each sub-pixel is in an off state. Moreover, the data lines DA1 to DA3 may not be loaded with a voltage, and are all in a suspension joint state.

When a display frequency of a display is changed from a high frequency to a low frequency, if the display displays a same image, brightness of the image displayed at the low frequency is higher than brightness of the image displayed at the high frequency. This is caused by a fact that a charging rate in a data refresh stage at the low frequency is higher than a charging rate in a data refresh stage at the high frequency. Although a transistor in a sub-pixel has a leakage phenomenon in the blanking time phase, in this case, the leakage phenomenon of the transistor accounts for a smaller proportion than a charging rate. In order to keep brightness stable when the display is switched under different frequencies, avoid abnormal display images caused by switching frequencies, improve display quality of the display, and improve view experience, embodiments of the present disclosure provide a method for driving a display panel, which can solve the problem of increased brightness of a display image when the display frequency of the display changes from the high frequency to the low frequency, maintain stable brightness, and improve display quality and view experience.

In the method for driving the display panel in the embodiments of the present disclosure, the display panel works in a plurality of continuous display frames, and each display frame may include a data refresh phase and a blanking time phase. In the data refresh phase of at least one display frame of the plurality of continuous display frames, a gate-on voltage is loaded to a gate line(s) in the display panel, and a data voltage of a to-be-displayed image is loaded to each data line, to input a corresponding data voltage to each sub-pixel, so as to realize image display of one display frame. Moreover, in in the blanking time phase of the at least one display frame, a gate-off voltage is loaded to a gate line(s) in the display panel, and a compensation voltage is loaded to each data line. This can solve the problem that when the display frequency of the display is switched from high frequency to low frequency, the brightness of the image displayed at the low frequency is increased compared with the image displayed at the high frequency, keep brightness stable, and improve display quality and view experience.

Figure 3:
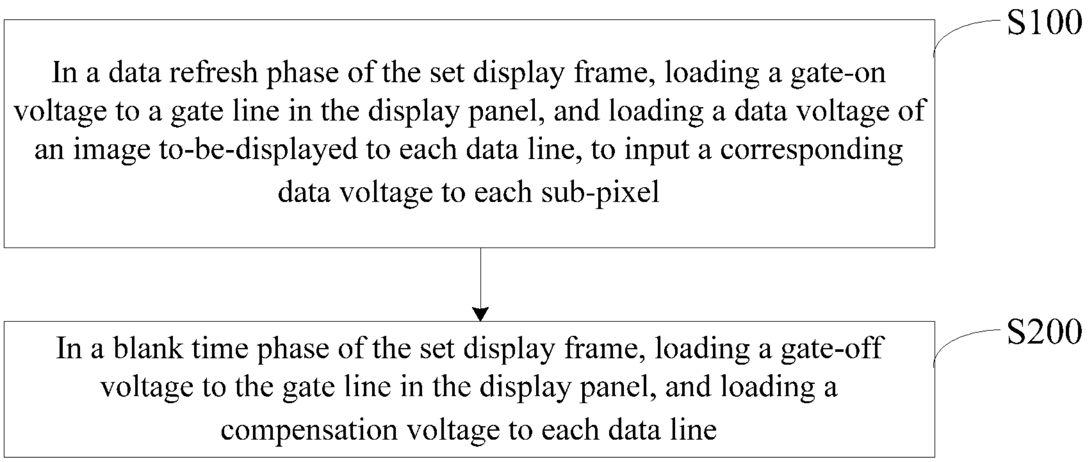
FIG. 3 is a flowchart of a method for driving a display panel according to an embodiment of the present disclosure.

In the embodiments of the present disclosure, a display frame, in which a compensation voltage is loaded to a data line in the blanking time phase, is defined as a set display frame. As shown in FIG. 3, the method for driving the display panel provided by the embodiments of the present disclosure may include the following steps.

S100, in a data refresh phase of the set display frame, loading a gate-on voltage to a gate line in the display panel, and loading a data voltage of a to-be-displayed image to each data line, to input a corresponding data voltage to each sub-pixel.

S200, in a blanking time phase of the set display frame, loading a gate-off voltage to the gate line in the display panel, and loading a compensation voltage to each data line.

Figure 1B:
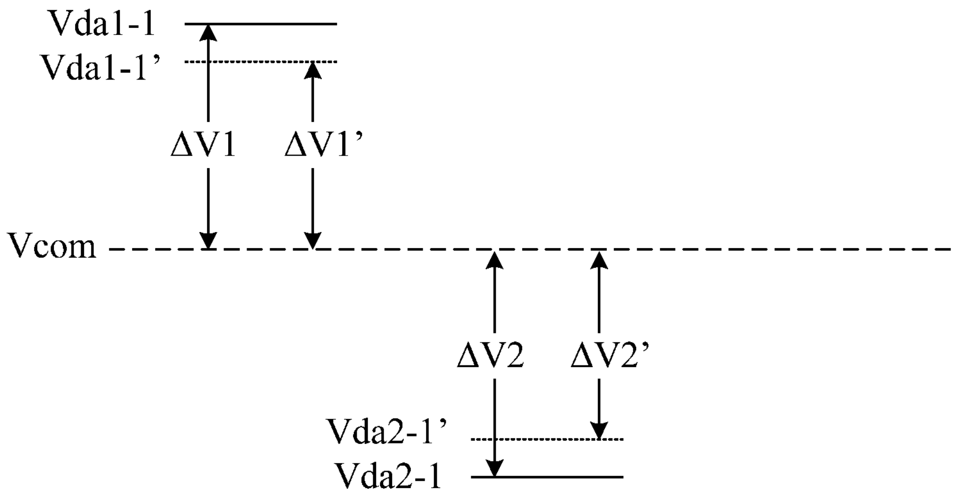
FIG. 1B is a schematic diagram of a common electrode voltage and a data voltage according to an embodiment of the present disclosure.

It should be noted that the display panel in the embodiments of the present disclosure may be a liquid crystal display panel. In the embodiments of the present disclosure, a set display frame is designed among the plurality of continuous display frames. The set display frame has a data refresh phase and a blanking time phase. Here, in the data refresh phase, the gate-on voltage is loaded to a gate line(s) in the display panel, and the data voltage of the to-be-displayed image is loaded to each data line, so that a corresponding data voltage is input to each sub-pixel, thereby realizing image display of the display frame. In the blanking time phase, the gate-off voltage is loaded to the gate line(s) in the display panel, so as to control the transistor in each sub-pixel to be in an off state. Further, the compensation voltage is loaded to each data line, and when the data voltage in the sub-pixel connected with the data line is higher than the common electrode voltage, the compensation voltage loaded to the data line is lower than the data voltage in the sub-pixel connected with the data line. As shown in FIG. 1A and FIG. 1B, Vda1-1~Vda1-4 respectively represent data voltages input to sub-pixels in the first row to the fourth row of the first column of sub-pixels. Vdc1 represents the compensation voltage loaded on the data line DA1 connected with the first column of sub-pixels. If Vda1-1~Vda1-4 are all greater than the common electrode voltage Vcom, and Vdc1 is less than Vda1-1~Vda1-4, due to the leakage of the transistor in the sub-pixel, the direction of the leakage current is from the sub-pixel to the data line DA1, so that the voltages Vda1-1~Vda1-4 drop. For example, Vda1-1 is reduced to Vda1-1'. This allows a voltage difference ΔV1 between Vda1-1 and Vcom to be reduced to ΔV1'. Since the brightness of the sub-pixel is related to the voltage difference between the data voltage in the sub-pixel and the voltage of the common electrode, the reduction of the voltage difference can reduce the brightness of the sub-pixel, therefore, the brightness of the first row of sub-pixels can be reduced.

Moreover, when the data voltage in the sub-pixel connected with the data line is lower than the common electrode voltage, the compensation voltage loaded on the data line is higher than the data voltage in the sub-pixel connected with the data line. As shown in FIG. 1A and FIG. 1, Vda2-1~Vda2-4 respectively represent the data voltages input to the sub-pixels in the first row to the fourth row in the second column of sub-pixels. Vdc2 represents the compensation voltage loaded on the data line DA2 connected with the second column of sub-pixels. If Vda2-1~Vda2-4 are all less than the common electrode voltage Vcom, and Vdc2 is greater than Vda1-1~Vda1-4, due to the leakage of the transistor in the sub-pixel, the direction of the leakage current is from the data line DA2 to the sub-pixel, so that voltages Vda1-1~Vda1-4 increase. For example, Vda2-1 is increased to Vda2-1'. This allows the voltage difference ΔV2 between Vda2-1 and Vcom to be reduced to ΔV2'. Since the brightness of the sub-pixel is related to the voltage difference between the data voltage in the sub-pixel and the common electrode voltage, the reduction of the voltage difference can reduce the brightness of the sub-pixel, therefore, the brightness of the second row of sub-pixels can be reduced.

The rest are the same, so that the brightness of the sub-pixel can be reduced. In this way, when the display frequency is changed from high frequency to low frequency, by loading the compensation voltage to the data line, the brightness of the display image at low frequency can be reduced, so that the brightness of the display image at high frequency and the brightness of the display image at low frequency can be kept as stable as possible, improving display quality and view experience.

It should be noted that the display panel in the embodiments of the present disclosure may be a liquid crystal display panel. Exemplarily, when the data voltage of the pixel electrode of the sub-pixel is greater than the common electrode voltage, the polarity of the sub-pixel can be positive. When the data voltage of the pixel electrode of the sub-pixel is lower than the common electrode voltage, the polarity of the sub-pixel can be negative. For example, in practical applications, the common electrode voltage on the common electrode can be 8V. Taking a sub-pixel as an example, if a voltage of 8V-12V is loaded to the pixel electrode of the sub-pixel, liquid crystal molecules at the sub-pixel can be for a positive polarity. Taking gray scales 0 to 255 as an example, the sub-pixel corresponds to a brightness of ±255 gray scales when a voltage of 12V is loaded to the pixel electrode. If a voltage of 4V-8V is loaded to the pixel electrode of the sub-pixel, liquid crystal molecules at the sub-pixel can be for a negative polarity. Taking gray scales 0 to 255 as an example, the sub-pixel corresponds to a brightness of −255 gray scales when a voltage of 4V is loaded to the pixel electrode.

Figure 4A:
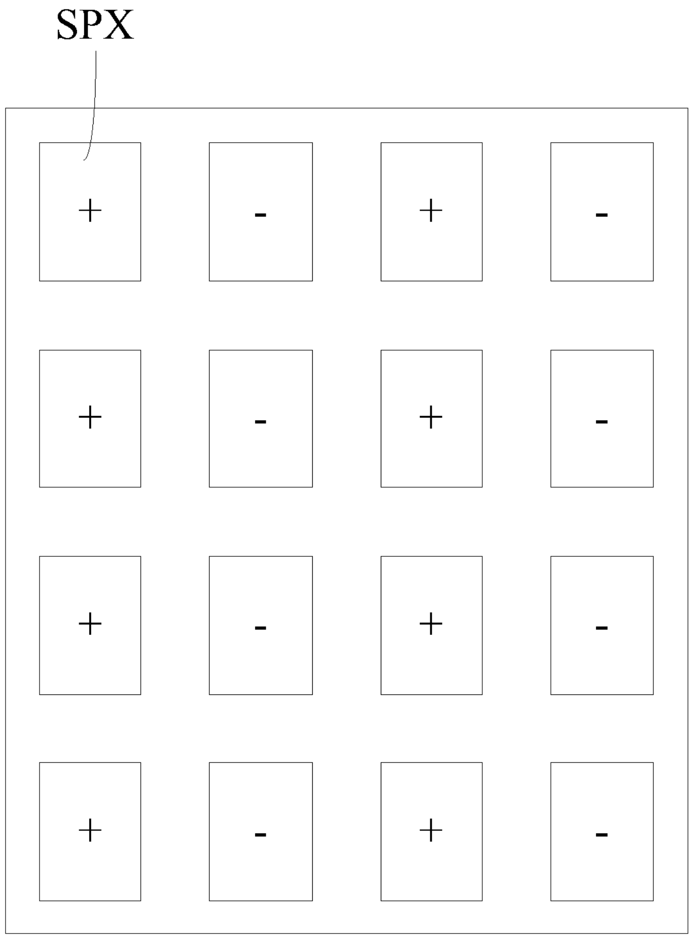
FIG. 4A is some schematic diagrams of a polarity of each sub-pixel in the display panel corresponding to a previous display frame in two adjacent display frames according to an embodiment of the present disclosure.
Figure 4B:
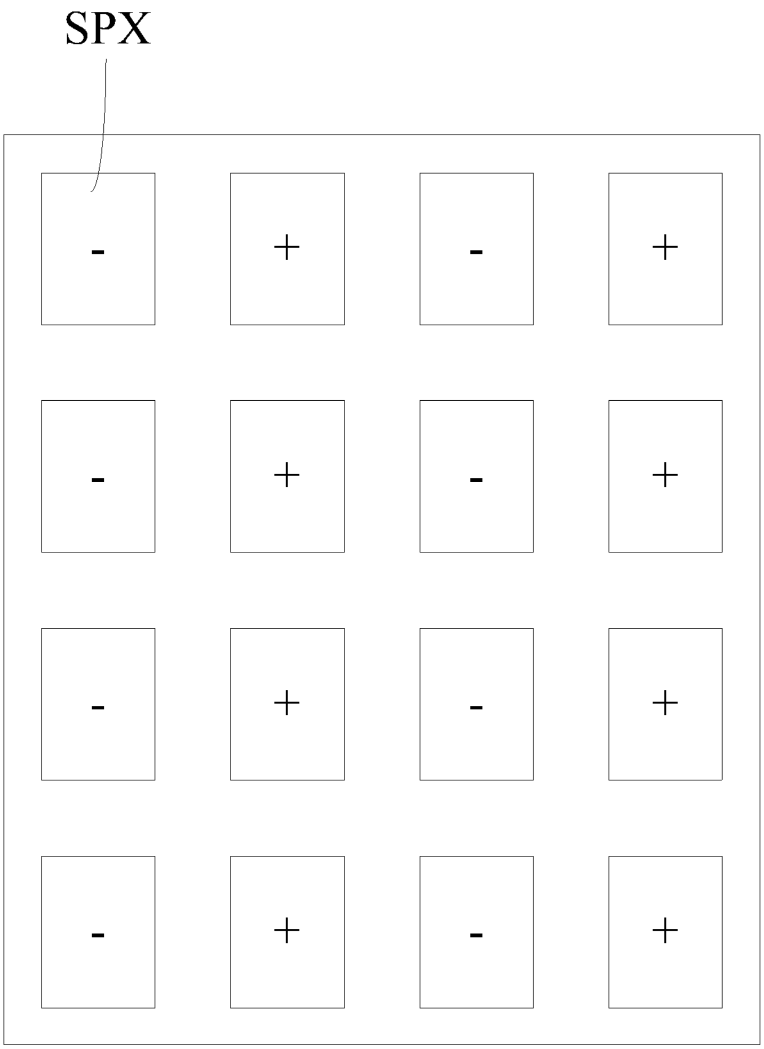
FIG. 4B is some schematic diagrams of a polarity of each sub-pixel in the display panel corresponding to a next display frame in two adjacent display frames according to an embodiment of the present disclosure.

In order to pursue a better display effect, for the control of liquid crystal molecules, a column inversion method or frame inversion method is used to improve the display effect of the liquid crystal molecules. In actual usage, the inversion of the liquid crystal molecules is driven by an electric field, so that its polarity is reversed. In the embodiments of the present disclosure, in order to improve the performance of the liquid crystal, the display panel may adopt the column inversion method. Exemplarily, FIG. 4A and FIG. 4B schematically illustrate polarities of sub-pixels in two adjacent display frames when the display panel adopts the column inversion method. Here, FIG. 4A schematically shows the polarity of each sub-pixel in the display panel corresponding to the previous display frame of two adjacent display frames. FIG. 4B schematically shows the polarity of each sub-pixel in the display panel corresponding to the next display frame of two adjacent display frames. Here, "+" represents that the polarity of the sub-pixel is positive, and "−" represents that the polarity of the sub-pixel is negative. For example, sub-pixel columns with a positive polarity and sub-pixel columns with a negative polarity are arranged alternately. Moreover, for the same column of sub-pixels, in the last display frame, the column of sub-pixels has a positive polarity, and in the next display frame, the row of sub-pixels has a negative polarity. And in the last display frame, the column of sub-pixels has a negative polarity, and in the next display frame, the row of sub-pixels has a positive polarity.

Figure 4C:
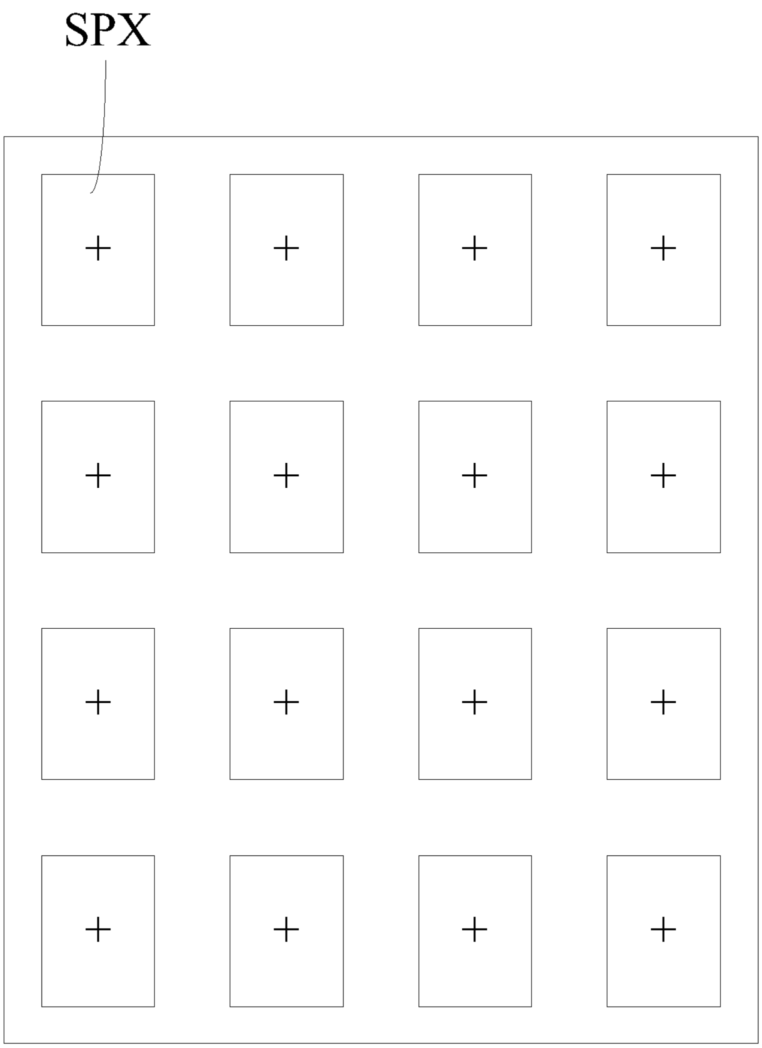
FIG. 4C is another schematic diagram of a polarity of each sub-pixel in the display panel corresponding to a previous display frame in two adjacent display frames according to an embodiment of the present disclosure.
Figure 4D:
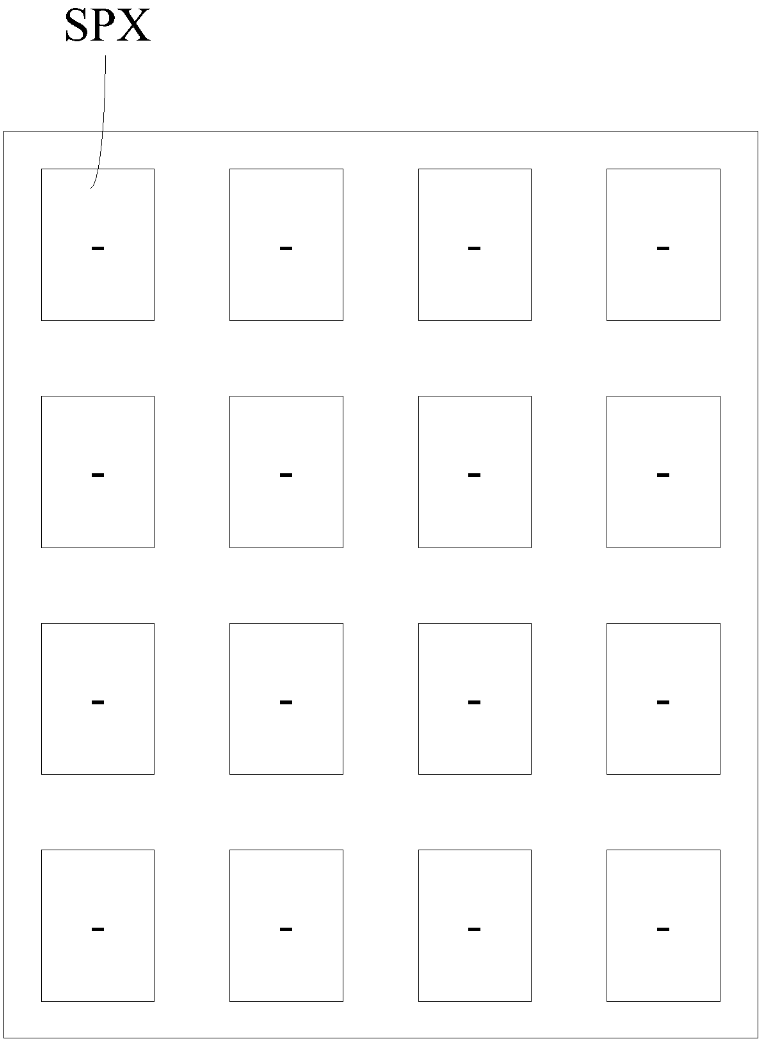
FIG. 4D is another schematic diagram of a polarity of each sub-pixel in the display panel corresponding to a next display frame in two adjacent display frames according to an embodiment of the present disclosure.

In the embodiments of the present disclosure, in order to improve the performance of the liquid crystal and reduce the power consumption, the display panel may adopt the frame inversion mode. Exemplarily, FIG. 4C and FIG. 4D schematically show the polarities of sub-pixels in two adjacent display frames when the display panel adopts the frame inversion mode. Here, FIG. 4C schematically shows the polarity of each sub-pixel in the display panel corresponding to the previous display frame of two adjacent display frames. FIG. 4D schematically shows the polarity of each sub-pixel in the display panel corresponding to the next display frame of two adjacent display frames. Here, "+" represents that the polarity of the sub-pixel is positive, and "−" represents that the polarity of the sub-pixel is negative. For example, in the last display frame, each sub-pixel column has a positive polarity. In the next display frame, each sub-pixel column has a negative polarity.

In the following, description will be made by taking the column inversion mode of the display panel as an example.

In the embodiments of the present disclosure, the compensation voltage may include a first sub-compensation voltage. For each data line, a polarity corresponding to the first sub-compensation voltage loaded on the data line is opposite to a polarity corresponding to the sub-pixel connected with the data line. For example, as shown in FIG. 4A, the first sub-pixel column corresponds to a positive polarity, then the polarity corresponding to the first sub-compensation voltage that can be loaded to the data line corresponding to the first sub-pixel column in the blanking time phase is a negative polarity, for example, a voltage selected from 4V-8V can be loaded to the data line. The second sub-pixel column corresponds to a negative polarity, then the polarity corresponding to the first sub-compensation voltage that can be loaded to the data line corresponding to the second sub-pixel column in the blanking time phase is a positive polarity, for example, the voltage selected from 8V to 12V can be loaded to the data line. The third sub-pixel column corresponds to a positive polarity, then the polarity corresponding to the first sub-compensation voltage that can be loaded to the data line corresponding to the third sub-pixel column in the blanking time phase is a negative polarity, for example, the voltage selected from 4V to 8V can be loaded to the data line. The fourth sub-pixel column corresponds to a negative polarity, then the polarity corresponding to the first sub-compensation voltage that can be loaded to the data line corresponding to the fourth sub-pixel column in the blanking time phase is a positive polarity, for example, the voltage selected from 8V to 12V can be loaded to the data line.

For example, as shown in FIG. 4B, the first sub-pixel column corresponds to a negative polarity, then the polarity corresponding to the first sub-compensation voltage that can be loaded to the data line corresponding to the first sub-pixel column in the blanking time phase is a positive polarity, for example, a voltage selected from 8V-12V can be loaded to the data line. The second sub-pixel column corresponds to a positive polarity, then the polarity corresponding to the first sub-compensation voltage that can be loaded to the data line corresponding to the second sub-pixel column in the blanking time phase is a negative polarity, for example, a voltage selected from 4V to 8V can be loaded to the data line. The third sub-pixel column corresponds to a negative polarity, then the polarity corresponding to the first sub-compensation voltage that can be loaded to the data line corresponding to the third sub-pixel column in the blanking time phase is a positive polarity, for example, a voltage selected from 8V to 12V is loaded to the data line. The fourth sub-pixel column corresponds to a positive polarity, then the polarity corresponding to the first sub-compensation voltage that can be loaded to the data line corresponding to the fourth sub-pixel column in the blanking time phase is a negative polarity, for example, a voltage selected from 4V to 8V can be loaded to the data line.

Figure 5:
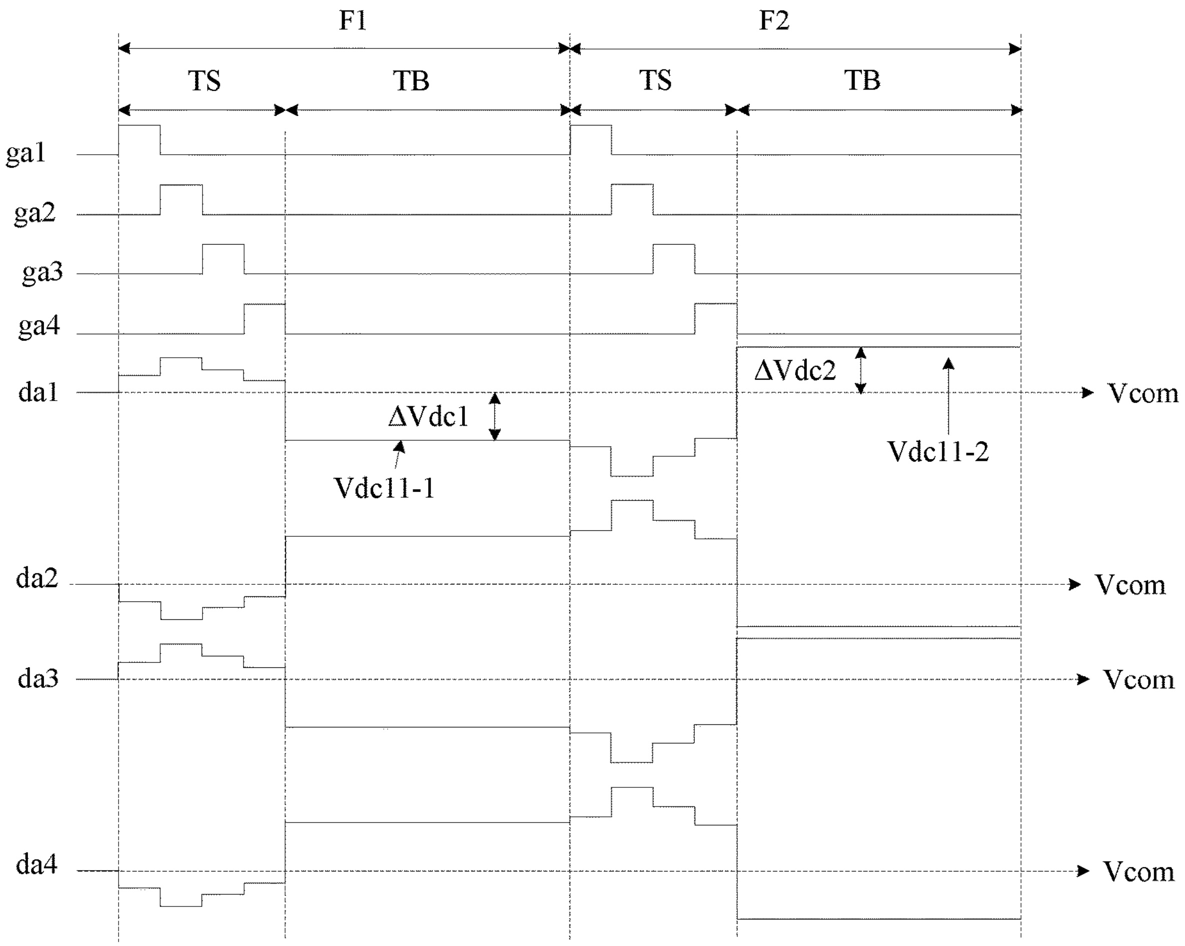
FIG. 5 is a timing diagram of some signals according to an embodiment of the present disclosure.

In the embodiments of the present disclosure, in two adjacent set display frames, for the same data line, the first sub-compensation voltage loaded on the data line in the previous set display frame and the common electrode voltage have a first difference therebetween. The first sub-compensation voltage loaded on the data line in the next set display frame and the common electrode voltage have a second difference therebetween. An absolute value of the first difference may be equal to an absolute value of the second difference. For example, as shown in FIG. 5, in the F1 display frame, there is a first difference ΔVdc1 between the first sub-compensation voltage Vdc11-1 loaded to the data line and the common electrode voltage Vcom. In the F2 display frame, there is a second difference ΔVdc2 between the first sub-compensation voltage Vdc11-2 loaded to the data line and the common electrode voltage Vcom. |ΔVdc1|=|ΔVdc2|, which can reduce the amount of calculation for determining the first sub-compensation voltage and reduce power consumption.

In the embodiments of the present disclosure, the compensation voltage may be fully loaded in the blanking time phase of at least one display frame. For example, as shown in FIG. 5, the first sub-compensation voltage may be loaded to each data line in the entire blanking time phase TB in the F1 display frame. In the entire blanking time phase TB in the F2 display frame, the first sub-compensation voltage is loaded to each data line.

In the embodiments of the present disclosure, each display frame of the plurality of continuous display frames may be set as a set display frame. That is, in the data refresh phase included in each display frame of the plurality of continuous display frames, the gate-on voltage is loaded to the gate line(s) in the display panel, and the data voltage of the to-be-displayed image is loaded to each data line, to input a corresponding data voltage to each sub-pixel. And, in the blanking time phase included in each display frame of the plurality of continuous display frames, the gate-off voltage is loaded to the gate line(s) in the display panel, and the first sub-compensation voltage is loaded to each data line. This can compensate for each display frame, so that the brightness can be kept stable.

In the embodiments of the present disclosure, gray scales corresponding to compensation voltages applied to data lines can be the same. In this way, the gray scale of each compensation voltage can be determined without excessive calculation, and power consumption can be reduced. Exemplarily, the gray scales corresponding to the first sub-compensation voltage loaded to the data lines may be the same. In this way, the amount of calculation for determining the first sub-compensation voltage in different set display frames can be reduced, and the power consumption can be reduced. For example, the gray scale corresponding to the first sub-compensation voltage loaded on each data line is a gray scale 127. As shown in FIG. 4A, the first sub-pixel column corresponds to a positive polarity, then the polarity corresponding to the first sub-compensation voltage that can be loaded to the data line corresponding to the first sub-pixel column is a negative polarity, and a voltage corresponding to the gray scale 127 selected from 4V to 8V can be loaded to the data line. The second sub-pixel column corresponds to a negative polarity, then the polarity corresponding to the first sub-compensation voltage that can be loaded to the data line corresponding to the second sub-pixel column is a positive polarity, and a voltage corresponding to the gray scale 127 selected from 8V to 12V can be loaded to the data line. The third sub-pixel column corresponds to a positive polarity, then the polarity corresponding to the first sub-compensation voltage that can be loaded to the data line corresponding to the third sub-pixel column is a negative polarity, and a voltage corresponding to the gray scale 127 selected from 4V to 8V can be loaded to the data line. The fourth sub-pixel column corresponds to a negative polarity, then the polarity corresponding to the compensation voltage that can be loaded to the data line corresponding to the fourth sub-pixel column is a positive polarity, and a voltage corresponding to the gray scale 127 selected from 8V to 12V can be loaded to the data line.

As shown in FIG. 4B, the first sub-pixel column corresponds to a negative polarity, then the polarity corresponding to the first sub-compensation voltage that can be loaded to the data line corresponding to the first sub-pixel column is a positive polarity, and a voltage corresponding to the gray scale 127 selected from 8V to 12V can be loaded to the data line. The second sub-pixel column corresponds to a positive polarity, then the polarity corresponding to the first sub-compensation voltage that can be loaded to the data line corresponding to the second sub-pixel column is a negative polarity, and a voltage corresponding to the gray scale 127 selected from 4V to 8V can be loaded to the data line. The third sub-pixel column corresponds to a negative polarity, then the polarity corresponding to the first sub-compensation voltage that can be loaded to the data line corresponding to the third sub-pixel column is a positive polarity, and a voltage corresponding to the gray scale 127 selected from 8V to 12V can be loaded to the data line. The fourth sub-pixel column corresponds to a positive polarity, then the polarity corresponding to the first sub-compensation voltage that can be loaded to the data line corresponding to the fourth sub-pixel column is a negative polarity, and a voltage corresponding to the gray scale 127 selected from 4V to 8V can be loaded to the data line.

In the embodiments of the present disclosure, a voltage value of the compensation voltage may be a voltage value of any gray scale. Exemplarily, the voltage value of the first sub-compensation voltage may be a voltage value of any gray scale. For example, the gray scale corresponding to the first sub-compensation voltage loaded to each data line may be selected from 0 to 255 gray scales, for example, may be the gray scale 127 or the gray scale 200. Any gray scale here means that the same voltage of any gray scale can be added to the sub-pixels of the display panel that need to be compensated. The compensation method is simple, no additional compensation modules or operations are required, and power consumption is reduced. In practical applications, the gray scale can be selected according to the needs of practical applications, which is not limited herein.

In the embodiments of the present disclosure, for each data line, the gray scale corresponding to the compensation voltage loaded on the data line is the same as the gray scale corresponding to a data voltage in the sub-pixel connected with the data line. For example, for each data line, the gray scale corresponding to the first sub-compensation voltage loaded on the data line is the same as the gray scale corresponding to one data voltage in the sub-pixels connected with the data line. For example, the gray scale corresponding to the first sub-compensation voltage loaded on the data line corresponding to the first sub-pixel column may be the same as the gray scale corresponding to the data voltage in the first row of sub-pixels in the first sub-pixel column. Or the gray scale corresponding to the first sub-compensation voltage loaded on the data line corresponding to the first sub-pixel column may be the same as the gray scale corresponding to the data voltage in the first row of sub-pixels in the second sub-pixel column. Or the gray scale corresponding to the first sub-compensation voltage loaded on the data line corresponding to the first sub-pixel column may be the same as the gray scale corresponding to the data voltage in the last row of sub-pixels in the first sub-pixel column.

Figure 6:
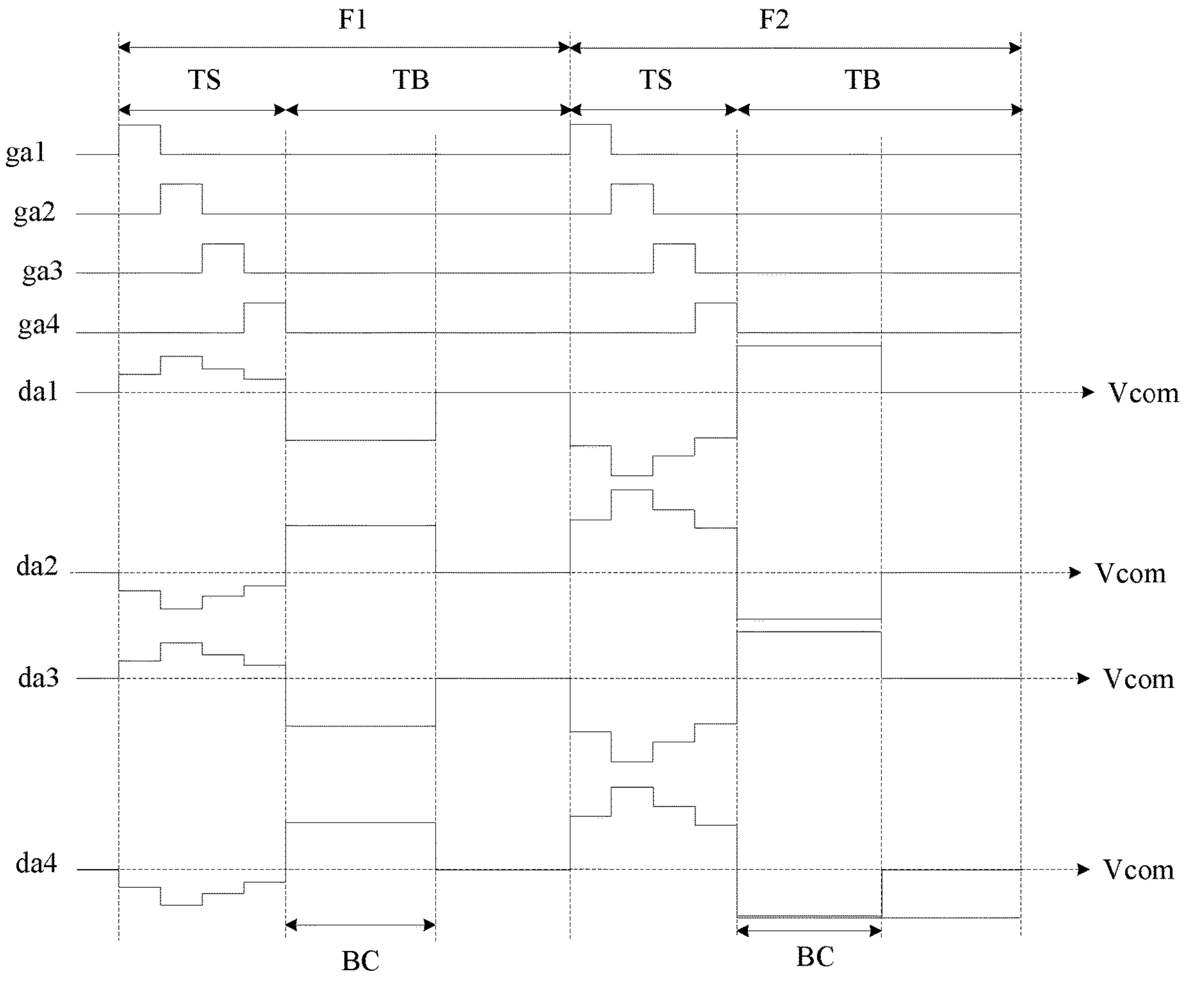
FIG. 6 is another timing diagram of some signals according to an embodiment of the present disclosure.

In the embodiments of the present disclosure, the blanking time phase of the set display frame may also be partially loaded with the first compensation voltage, for example, the blanking time phase may have at least one compensation phase, and the first sub-compensation voltage is loaded to the data line in the compensation phase. Exemplarily, as shown in FIG. 6, the blanking time phase of the set display frame may have one compensation phase BC. Alternatively, the blanking time phase of the set display frame may have a plurality of compensation stages, such as 3 compensation stages. Of course, in practical applications, the number of compensation stages that can be included in the blanking time phase of the set display frame can be set and determined according to the needs of practical applications, and is not limited herein.

In the embodiments of the present disclosure, in the case that the blanking time phase of the set display frame has the plurality of compensation stages, an interval between every two adjacent compensation stages is the same. In this way, the compensation voltage can be evenly loaded to the data line in the blanking time phase.

In the embodiments of the present disclosure, the duration of the compensation phase satisfies a relationship: 0<tc<1/2tb. Here, tc represents a duration of the compensation phase, and tb represents a duration of the blanking time phase. In this way, only a part of the blanking time phase can be used as a compensation phase, so as to prevent the voltage loaded on the data line from flowing back into the sub pixels due to transistor leakage, thereby affecting the brightness of the sub pixels.

In the embodiments of the present disclosure, a boundary of the compensation phase may coincide with a boundary of the data refresh phase. Alternatively, a certain period of time may be set between the boundary of the compensation phase and the boundary of the data refresh phase.

With reference to FIG. 1A, FIG. 4A to FIG. 5, the method for driving the display panel provided by the embodiments of the present disclosure will be described below. Here, each of the plurality of continuous display frames is a set display frame. FIG. 4A corresponds to the display frame F1, and FIG. 4B corresponds to the display frame F2. Further, the display frames F1 and F2 are two adjacent display frames of the plurality of continuous display frames.

In the display frame F1, in the data refresh phase TS, when the signal ga1 has a gate-on voltage, the transistors 01 in the first row of sub-pixels can be controlled to be turned on, and the corresponding data voltage da1 is loaded to the data line DA1, the corresponding data voltage da2 is loaded to the data line DA2 and the corresponding data voltage da3 is loaded to the data line DA3, so that the corresponding data voltage is input to the pixel electrode 02 in the first row of sub-pixels. When the signal ga2 has a gate-on voltage, the transistors 01 in the second row of sub-pixels can be controlled to be turned on, and the corresponding data voltage da1 is loaded to the data line DAL, the corresponding data voltage da2 is loaded to the data line DA2, and the corresponding data voltage da3 is loaded to the data line DA3, so that the corresponding data voltage is input to the pixel electrode 02 in the second row of sub-pixels. When the signal ga3 has a gate-on voltage, the transistors 01 in the third row of sub-pixels can be controlled to be turned on, and the corresponding data voltage da1 is loaded to the data line DA1, the corresponding data voltage da2 is loaded to the data line DA2, and the corresponding data voltage da3 is loaded to the data line DA3, so that the corresponding data voltage is input to the pixel electrode 02 in the third row of sub-pixels. When the signal ga4 has a gate-on voltage, the transistors 01 in the fourth row of sub-pixels can be controlled to be turned on, the corresponding data voltage da1 is loaded to the data line DAL, the corresponding data voltage da2 is loaded to the data line DA2, and the corresponding data voltage da3 is loaded to the data line DA3, so that the corresponding data voltage is input to the pixel electrode 02 in the fourth row of sub-pixels. The rest of rows are deduced in the same way, and will not be repeated herein.

In the blanking time phase TB, the gate-off voltage is simultaneously loaded to the gate lines in the display panel, so as to control the transistor 01 in each sub-pixel to be in an off state. A voltage corresponding to the gray scale 127 is selected from 4V-8V as the first sub-compensation voltage corresponding to the negative polarity, and loaded to the data line corresponding to the first sub-pixel column. A voltage corresponding to the gray scale 127 is selected from 8V-12V as the first sub-compensation voltage corresponding to the positive polarity, and loaded to the data line corresponding to the second sub-pixel column. A voltage corresponding to the gray scale 127 is selected from 4V-8V as the first sub-compensation voltage corresponding to the negative polarity, and loaded to the data line corresponding to the third sub-pixel column. A voltage corresponding to the gray scale 127 is selected from 8V-12V as the first sub-compensation voltage corresponding to the positive polarity, and loaded to the data line corresponding to the fourth sub-pixel column.

In the display frame F2, in the data refresh phase TS, when the signal ga1 has a gate-on voltage, all the transistors 01 in the first row of sub-pixels can be controlled to be turned on, and the corresponding data voltage da1 is loaded to the data line DA1, the corresponding data voltage da2 is loaded to the data line DA2, and the corresponding data voltage da3 is loaded to the data line DA3, so that the corresponding data voltage is input to the pixel electrode 02 in the first row of sub-pixels. When the signal ga2 has a gate-on voltage, all the transistors 01 in the second row of sub-pixels can be controlled to be turned on, and the corresponding data voltage da1 is loaded to the data line DA1, the corresponding data voltage da2 is loaded to the data line DA2, and the corresponding data voltage da3 is loaded to the data line DA3, so that the corresponding data voltage is input to the pixel electrode 02 in the second row of sub-pixels. When the signal ga3 has a gate-on voltage, all the transistors 01 in the third row of sub-pixels can be controlled to be turned on, and the corresponding data voltage da1 is loaded to the data line DA1, the corresponding data voltage da2 is loaded to the data line DA2, and the corresponding data voltage da3 is loaded to the data line DA3, so that the corresponding data voltage is input to the pixel electrode 02 in the third row of sub-pixels. When the signal ga4 has a gate-on voltage, all the transistors 01 in the fourth row of sub-pixels can be controlled to be turned on, and the corresponding data voltage da1 is loaded to the data line DA1, and the corresponding data voltage da2 is loaded to the data line DA2, and the corresponding data voltage da3 is loaded to the data line DA3, so that the corresponding data voltage is input to the pixel electrode 02 in the fourth row of sub-pixels. The rest of rows are deduced in the same way, and will not be repeated herein.

In the blanking time phase TB, the gate-off voltage is simultaneously applied to the gate lines in the display panel, so as to control the transistor 01 in each sub-pixel to be in an off state. A voltage corresponding to the gray scale 127 is selected from 8V-12V as the first sub-compensation voltage corresponding to the positive polarity, and loaded to the data line corresponding to the first sub-pixel column. A voltage corresponding to the gray scale 127 is selected from 4V-8V as the first sub-compensation voltage corresponding to the negative polarity, and loaded to the data line corresponding to the second sub-pixel column. A voltage corresponding to the gray scale 127 is selected from 8V-12V as the first sub-compensation voltage corresponding to the positive polarity, and loaded to the data line corresponding to the third sub-pixel column. A voltage corresponding to the gray scale 127 is selected from 4V-8V as the first sub-compensation voltage corresponding to the negative polarity, and loaded to the data line corresponding to the fourth sub-pixel column.

Other display frames are deduced in the same way, and will not be described herein.

The embodiments of the present disclosure provide some other methods for driving the display panel, which are modified with respect to the implementation manners in the above-mentioned embodiments. The following only describes the differences between this embodiment and the above-mentioned embodiments, and the similarities will not be repeated herein.

In the embodiments of the present disclosure, the compensation voltage may further include a transition compensation voltage that appears before the first sub-compensation voltage. Moreover, when the data voltage in the sub-pixels connected with the data line is higher than the common electrode voltage, the transition compensation voltage loaded on the data line is lower than the data voltage in the sub-pixels connected with the data line. When the data voltage in the sub-pixels connected with the data line is lower than the common electrode voltage, the transition compensation voltage loaded on the data line is greater than the data voltage in the sub-pixels connected with the data line.

Figure 7:
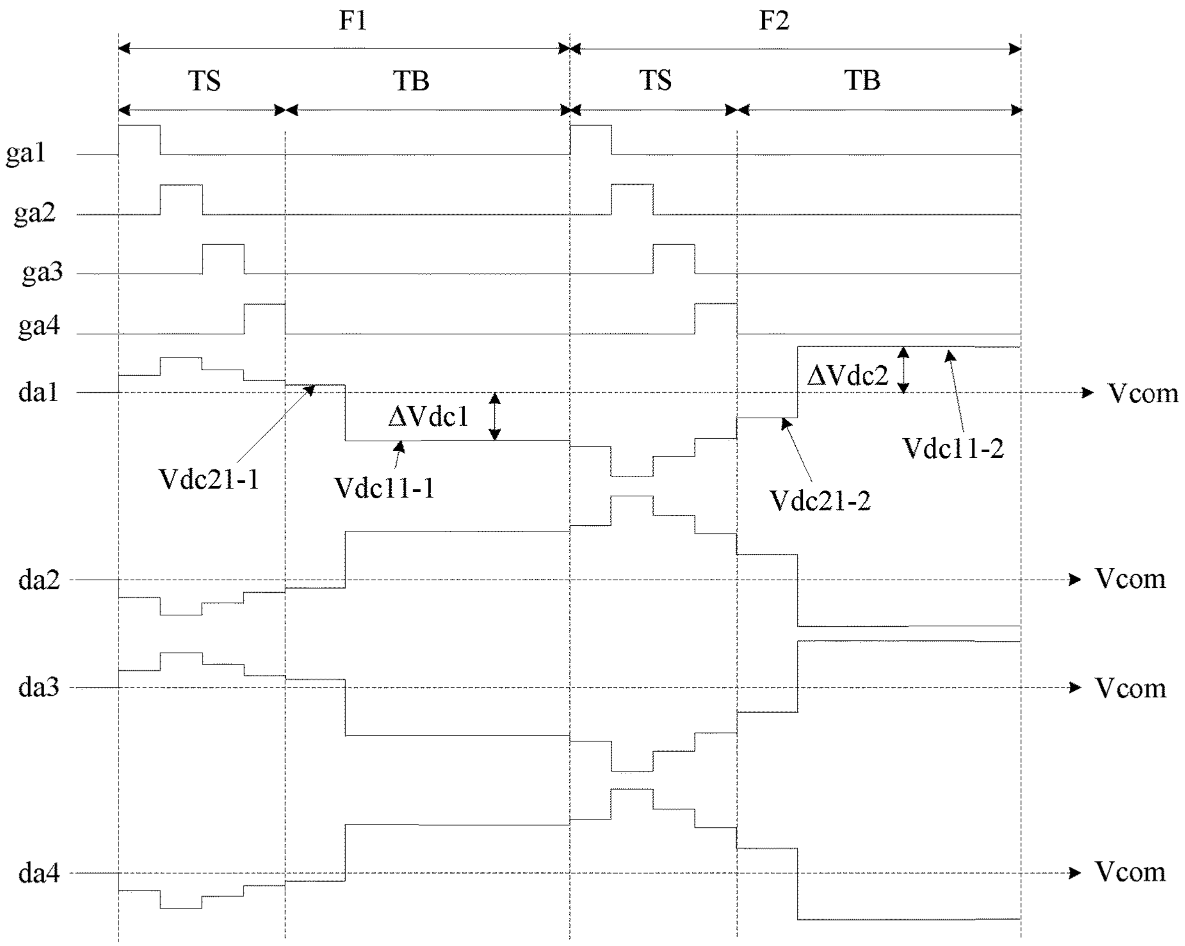
FIG. 7 is another timing diagram of some signals according to an embodiment of the present disclosure.
Figure 8:
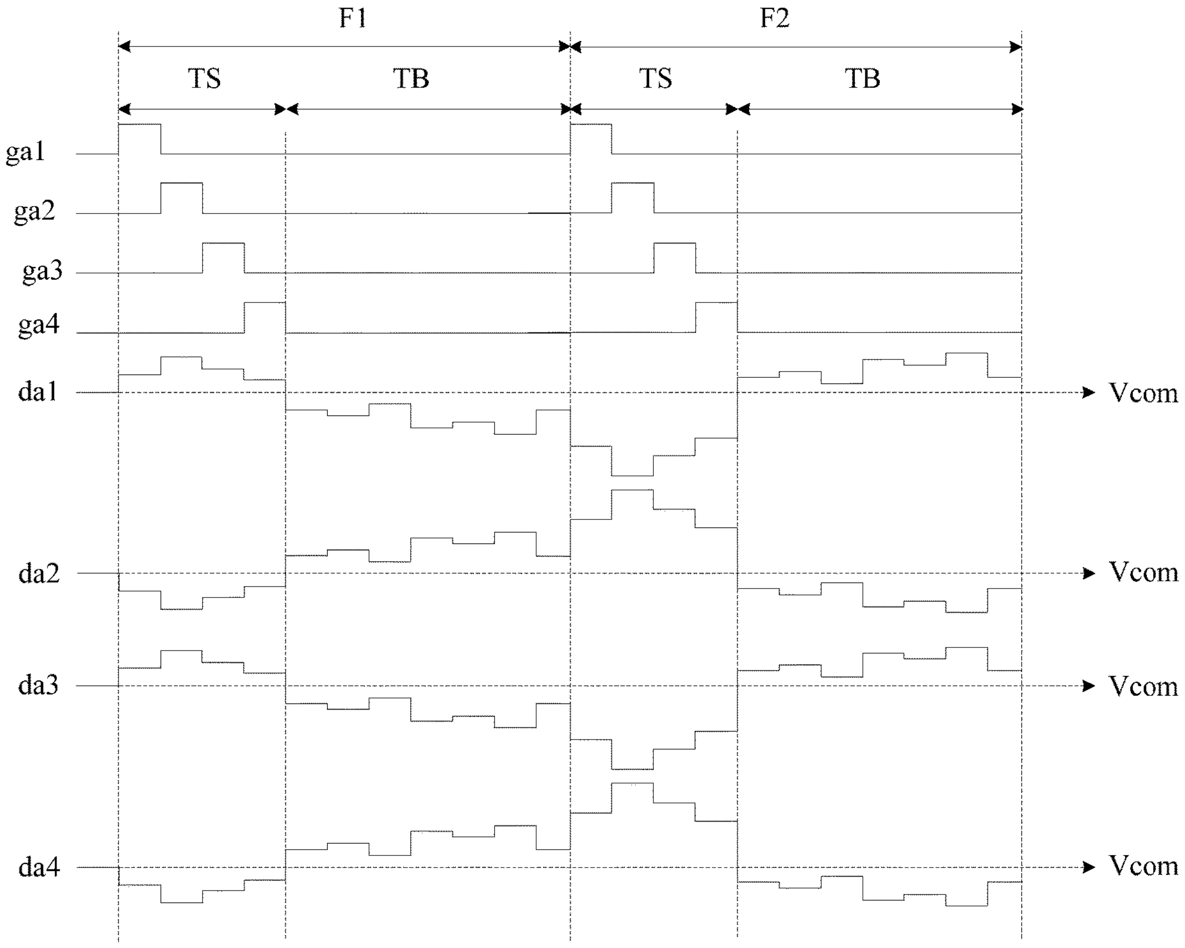
FIG. 8 is another timing diagram of some signals according to an embodiment of the present disclosure.

In the embodiments of the present disclosure, for each data line, the polarity corresponding to the transition compensation voltage loaded on the data line is the same as the polarity corresponding to the sub-pixels connected with the data line. For example, as shown in FIG. 4A and FIG. 7, in the display frame F1, the first sub-pixel column in the data refresh phase TS corresponds to the positive polarity, then in the blanking time phase TB, the data line corresponding to the first sub-pixel column can be first loaded with a transition compensation voltage Vdc21-1 corresponding to the positive polarity, for example, a voltage selected from 8V to 12V is taken as the transition compensation voltage Vdc21-1 and loaded to the data line, and then the data line corresponding to the first sub-pixel column can be loaded with the first sub-compensation voltage Vdc11-1 corresponding to the negative polarity, for example, a voltage selected from 4V to 8V is taken as the first sub-compensation voltage Vdc11-1 and loaded to the data line. In the data refresh phase TS, the second sub-pixel column corresponds to the negative polarity, then in the blanking time phase TB, the data line corresponding to the second sub-pixel column can be first loaded with a transition compensation voltage corresponding to the negative polarity, for example, a voltage selected from 4V to 8V is taken as the transition compensation voltage and loaded to the data line, and then the data line corresponding to the second sub-pixel column can be loaded with the first sub-compensation voltage corresponding to the positive polarity, for example, a voltage selected from 8V to 12V is taken as the first sub-compensation voltage and loaded to the data line. The manners for loading the transition compensation voltage and the first sub-compensation voltage on the data line corresponding to the third sub-pixel column are the same as the manners for loading the transition compensation voltage and the first sub-compensation voltage on the data line corresponding to the first sub-pixel column, and will not be repeated herein. The manners for loading the transition compensation voltage and the first sub-compensation voltage on the data line corresponding to the fourth sub-pixel column are the same as the manners for loading the transition compensation voltage and the first sub-compensation voltage on the data line corresponding to the second sub-pixel column, and will not be repeated herein.

For example, as shown in FIG. 4A and FIG. 7, in the display frame F2, the first sub-pixel column in the data refresh phase TS corresponds to the negative polarity, then in the blanking time phase TB, the data line corresponding to the first sub-pixel column can be first loaded with the transition compensation voltage Vdc21-2 corresponding to the negative polarity, for example, a voltage selected from 4V to 8V is taken as the transition compensation voltage Vdc21-2 and loaded to the data line, and then the data line corresponding to the first sub-pixel column can be loaded with the first sub-compensation voltage Vdc11-2 corresponding to the positive polarity, for example, a voltage selected from 8V to 12V is taken as the first sub-compensation voltage Vdc11-2, and loaded to the data line. In the data refresh phase TS, the second sub-pixel column corresponds to the positive polarity, then in the blanking time phase TB, the data line corresponding to the second sub-pixel column can be first loaded with the transition compensation voltage corresponding to the positive polarity, for example, a voltage selected from 8V to 12V is taken as the transition compensation voltage and loaded to the data line, and then the data line corresponding to the second sub-pixel column is loaded with the first sub-compensation voltage corresponding to the negative polarity, for example, a voltage selected from 4V-8V is taken as the first sub-compensation voltage, and loaded to the data line. The manners for loading the transition compensation voltage and the first sub-compensation voltage on the data line corresponding to the third sub-pixel column are the same as the manners for loading the transition compensation voltage and the first sub-compensation voltage on the data line corresponding to the first sub-pixel column, and will not be repeated herein. The manners for loading the transition compensation voltage and the first sub-compensation voltage on the data line corresponding to the fourth sub-pixel column are the same as the manners for loading the transition compensation voltage and the first sub-compensation voltage on the data line corresponding to the second sub-pixel column, and will not be repeated herein.

Embodiments of the present disclosure further provide some methods for driving the display panel, which are modified for the implementation manners in the above embodiments. The following only describes the differences between this embodiment and the above-mentioned embodiments, and the similarities will not be repeated herein.

In the embodiments of the present disclosure, the following formula may also be used to determine the gray scale corresponding to the compensation voltage:

$$VS11=(VA11+VA12)/2.$$

Here, VS11 represents the gray scale corresponding to the compensation voltage, VA11 represents the maximum gray scale in a display frame selected from the plurality of continuous display frames, and VA12 represents the minimum gray scale in the display frame selected from the plurality of continuous display frames, and VA11+VA12 is an even number.

Exemplarily, for example, VS11 may represent the gray scale corresponding to the first sub-voltage in the compensation voltage, so the gray scale of the first sub-compensation voltage may be determined by VS11=(VA11+VA12)/2.

In the embodiments of the present disclosure, the display frame selected from the plurality of display frames may be a previous display frame adjacent to the set display frame. For example, as shown in FIG. 5, when VA11+VA12 is an even number, VS11 may represent the gray scale corresponding to the first sub-compensation voltage in the display frame F2, VA11 may represent the maximum gray scale corresponding to the data voltage input in the sub-pixel in the display frame F1, and VA12 may represent the minimum gray scale corresponding to the data voltage input in the sub-pixel in the display frame F1.

In the embodiments of the present disclosure, the display frame selected from the plurality of display frames may be the set display frame. For example, as shown in FIG. 5, when VA11+VA12 is an even number, VS11 may represent the gray scale corresponding to the first sub-compensation voltage in the display frame F1, and VA11 may represent the maximum gray scale corresponding to the data voltage input in the sub-pixel in the display frame F1, and VA12 may represent the minimum gray scale corresponding to the data voltage input in the sub-pixel in the display frame F1.

It should be noted that the rest of the working process of the method for driving the display panel corresponding to the embodiments may be basically the same as the rest of the working process of the method for driving the display panel in the above-mentioned embodiments, and will not be repeated herein.

Embodiments of the present disclosure provide still some methods for driving the display panel, which are modified with respect to the implementation manners in the foregoing embodiments. The following only describes the differences between this embodiment and the above-mentioned embodiments, and the similarities will not be repeated here.

In the embodiments of the present disclosure, the following formula may also be used to determine the gray scale corresponding to the compensation voltage:

$$VS21=(VA21+VA22+1)/2.$$

Here, VS21 represents the gray scale corresponding to the compensation voltage, VA21 represents the maximum gray scale in the display frame selected from the plurality of continuous display frames, and VA22 represents the minimum gray scale in the display frame selected from the plurality of continuous display frames, and VA21+VA22 is an odd number.

Exemplarily, for example, VS21 may represent the gray scale corresponding to the first sub-voltage in the compensation voltage, so the gray scale of the first sub-compensation voltage may be determined by VS21=(VA21+VA22+1)/2.

In the embodiments of the present disclosure, the display frame selected from the plurality of display frames may be a previous display frame adjacent to the set display frame. For example, as shown in FIG. 5, when VA21+VA22 is an odd number, VS21 may represent the gray scale corresponding to the first sub-compensation voltage in the display frame F2, VA21 may represent the maximum gray scale corresponding to the data voltage input in the sub-pixel in the display frame F1, and VA22 may represent the minimum gray scale corresponding to the data voltage input in the sub-pixel in the display frame F1.

In the embodiments of the present disclosure, the display frame selected from the plurality of display frames may be the set display frame. For example, as shown in FIG. 5, when VA21+VA22 is an odd number, VS21 can represent the gray scale corresponding to the first sub-compensation voltage in the display frame F1, VA21 can represent the maximum gray scale corresponding to the data voltage input in the sub-pixel in the display frame F1, and VA12 may represent the minimum gray scale corresponding to the data voltage input in the sub-pixel in the display frame F1.

It should be noted that the rest of the working process of the method for driving the display panel corresponding to the embodiments may be basically the same as the rest of the working process of the method for driving the display panel in the above-mentioned embodiments, and will not be repeated herein.

Embodiments of the present disclosure provide still some methods for driving the display panel, which are modified with respect to the implementation manners in the foregoing embodiments. The following only describes the differences between this embodiment and the above-mentioned embodiments, and the similarities will not be repeated herein.

In the embodiments of the present disclosure, loading the compensation voltage to each data line may include: in the blanking time phase of the set display frame, selecting a display frame from the plurality of display frames, and for each data line, loading a voltage of a gray scale, corresponding to a data voltage input into a row of sub-pixels of the display panel in the selected display frame, to the data line.

In the embodiments of the present disclosure, the display frame selected from the plurality of display frames may be a previous display frame adjacent to the set display frame.

In the embodiments of the present disclosure, the display frame selected from the plurality of display frames may be the set display frame.

In the embodiments of the present disclosure, loading the compensation voltage to each data line may include: in the blanking time phase of the set display frame, selecting a display frame from the plurality of display frames, and for each data line, loading a voltage of a gray scale, corresponding to a data voltage input into a first row of sub-pixels of the display panel in the selected display frame, to the data line to serve as the first sub-compensation voltage. For example, taking a display panel with four rows of sub-pixels as an example (of course, in practical applications, the number of rows of sub-pixels in a display panel is not only four, which can be determined according to actual conditions, and not limited herein), in combination with FIG. 4A to FIG. 5, in the display frame F2, the gray scale corresponding to the data voltage input in the first row of sub-pixels of the first sub-pixel column in the display frame F1 is selected as the gray scale corresponding to the first sub-compensation voltage input by the data line connected with the first sub-pixel column. For example, if the data voltage input in the first row of sub-pixels of the first sub-pixel column in the display frame F1 corresponds to a gray scale 120, then in the blanking time phase of the display frame F2, the voltage corresponding to the gray scale 120 loaded on the data line electrically connected with the first sub-pixel column is taken as the first sub-compensation voltage, and the polarity corresponding to the voltage corresponding to the gray scale 120 is opposite to the polarity corresponding to the first sub-pixel column in the display frame F2. The data voltage input in the first row of sub-pixels of the second sub-pixel column in the display frame F1 corresponds to the gray scale 220, then in the blanking time phase of the display frame F2, the voltage corresponding to the gray scale 220 loaded on the data line electrically connected with the second sub-pixel column is taken as the first sub-compensation voltage, and the polarity corresponding to the voltage corresponding to the gray scale 220 is opposite to the polarity corresponding to the second sub-pixel column in the display frame F2. The manner for loading the first sub-compensation voltage to the data line corresponding to the third sub-pixel column is the same as the manner for loading the first sub-compensation voltage to the data line corresponding to the first sub-pixel column. The manner for loading the first sub-compensation voltage to the data line corresponding to the fourth sub-pixel column is the same as the manner for loading the first sub-compensation voltage to the data line corresponding to the second sub-pixel column, which will not be repeated herein.

In the embodiments of the present disclosure, loading the compensation voltage to each data line may include: in the blanking time phase of the set display frame, selecting a display frame from a plurality of display frames, and for each data line, loading a voltage of a gray scale, corresponding to a data voltage input into a middle row of sub-pixels of the display panel in the selected display frame, to the data line, where the voltage is taken as the first sub-compensation voltage. For example, taking a display panel with four rows of sub-pixels as an example (of course, in practical applications, the number of rows of sub-pixels in a display panel is not only four, which can be determined according to actual conditions, and is not limited herein), in combination with FIG. 4A to FIG. 5, in the display frame F2, the gray scale corresponding to the data voltage input in the third row of sub-pixels in the display frame F1 is selected as the gray scale corresponding to the first sub-compensation voltage input by the data line electrically connected with the sub-pixels. For example, the data voltage input in the sub-pixels in the third row and first column in the display frame F1 corresponds to a gray scale 120, then in the blanking time phase in the display frame F2, the voltage corresponding to the gray scale 120 loaded on the data line electrically connected with the first column of sub-pixels is taken as the first sub-compensation voltage, and the polarity corresponding to the voltage of the gray scale 120 is opposite to the polarity corresponding to the sub-pixels in the third row and first column in the display frame F2. The data voltage input in the sub-pixels in the third row and second column in the display frame F1 corresponds to a gray scale 220, then in the blanking time phase in the display frame F2, the voltage corresponding to the gray scale 220 loaded on the data line electrically connected with the second column of sub-pixels is taken as the first sub-compensation voltage, and the polarity corresponding to the voltage of the gray scale 120 is opposite to the polarity corresponding to the sub-pixels in the third row and second column in the display frame F2. The data voltage input in the sub-pixels in the third row and third column in the display frame F1 corresponds to a gray scale 150, then in the blanking time phase in the display frame F2, the voltage corresponding to the gray scale 150 loaded on the data lines electrically connected with the third column of sub-pixels is taken as the first sub-compensation voltage, and the polarity corresponding to the voltage of the gray scale 150 is the same as the polarity corresponding to the sub-pixels in the third row and third column in the display frame F2. The data voltage input in the sub-pixels in the third row and fourth column in the display frame F1 corresponds to a gray scale 60, then in the blanking time phase in the display frame F2, the voltage corresponding to the gray scale 60 loaded on the data line electrically connected with the fourth column of sub-pixels is taken as the first sub-compensation voltage, and the polarity corresponding to the voltage of the gray scale 60 is opposite to the polarity corresponding to the sub-pixels in the third row and fourth column in the display frame F2.

In the embodiments of the present disclosure, loading the compensation voltage to each data line may include: in the blanking time phase of the set display frame, selecting a display frame from the plurality of display frames, and for each data line, loading a voltage of a gray scale, corresponding to a data voltage input into a last row of sub-pixels of the display panel in the selected display frame, to the data line, where the voltage is taken as the first sub-compensation voltage. For example, taking a display panel with four rows of sub-pixels as an example (of course, in practical applications, the number of rows of sub-pixels in a display panel is not only four, which can be determined according to actual applications, and is not limited herein), in combination with FIG. 4A to FIG. 5, in the display frame F2, the gray scale corresponding to the data voltage input in the fourth row of sub-pixels in the display frame F1 is selected as the gray scale corresponding to the compensation voltage input by the data line electrically connected with the sub-pixels. For example, the data voltage input in the sub-pixels in the fourth row and first column in the display frame F1 corresponds to a gray scale 120, then in the blanking time phase in the display frame F2, a voltage corresponding to the gray scale 120 loaded on the data line electrically connected with the first column of sub-pixels is taken as a first sub-compensation voltage, and the polarity corresponding to the voltage of the gray scale 120 is the same as the polarity corresponding to the sub-pixels in the fourth row and first column in the display frame F2. The data voltage input in the sub-pixels in the fourth row and second column in the display frame F1 corresponds to a gray scale 220, then in the blanking time phase in the display frame F2, a voltage corresponding to the gray scale 220 loaded on the data lines electrically connected with the second column of sub-pixels is taken as a first sub-compensation voltage, and the polarity corresponding to the voltage of the gray scale 220 is the same as the polarity corresponding to the sub-pixels in the fourth row and second column in the display frame F2. The data voltage input in the sub-pixels in the fourth row and third column in the display frame F1 corresponds to a gray scale 150, then in the blanking time phase in the display frame F2, a voltage corresponding to the gray scale 150 loaded on the data lines electrically connected with the third column of sub-pixels is taken as a first sub-compensation voltage, and the polarity corresponding to the voltage of the gray scale 150 is the same as the polarity corresponding to the sub-pixels in the fourth row and third column in the display frame F2. The data voltage input in the sub-pixels in the fourth row and fourth column in the display frame F1 corresponds to a gray scale 60, then in the blanking time phase in the display frame F2, a voltage corresponding to the gray scale 60 loaded on the data line electrically connected with the fourth column of sub-pixels is taken as a first sub-compensation voltage, and the polarity corresponding to the voltage of the gray scale 60 is the same as the polarity corresponding to the sub-pixels in the fourth row and fourth column in the display frame F2.

It should be noted that the rest of the working process of the method for driving the display panel corresponding to this embodiment may be basically the same as the rest of the working process of the method for driving the display panel in the above-mentioned embodiments, and will not be repeated herein.

Embodiments of the present disclosure provide still some methods for driving the display panel, which are modified with respect to the implementation manners in the foregoing embodiments. The following only describes the differences between this embodiment and the above-mentioned embodiments, and the similarities will not be repeated herein.

In the embodiments of the present disclosure, loading the compensation voltage to each data line may include: in the blanking time phase of a set display frame, selecting a display frame from the plurality of display frames, and for each data line, sequentially loading a voltage of a gray scale, corresponding to a data voltage input into the data line in the selected display frame, to the data line. In this way, the selection of the compensation voltage can be more diversified, and the compensation can be made more detailed.

In the embodiments of the present disclosure, the display frame selected from the plurality of display frames may be a previous display frame adjacent to the set display frame. For example, taking a display panel with four rows of sub-pixels as an example (of course, in practical applications, the number of rows of sub-pixels in a display panel is not only four, which can be determined according to actual applications, and is not limited herein), in combination with FIG. 4A to FIG. 8, in the display frame F2, a gray scale corresponding to a data voltage input in the sub-pixels in the first row to the fourth row in the display frame F1 is selected as the gray scale corresponding to the compensation voltage input in the data line electrically connected with the sub-pixels. For example, in the display frame F1, the data voltage input to the sub-pixels in the first row and first column corresponds to the gray scale 120, the data voltage input to the sub-pixels in the second row and first column corresponds to the gray scale 150, the data voltage input to the sub-pixels in the third row and first column corresponds to the gray scale 60, and the data voltage input to the sub-pixels in the fourth row and first column corresponds to the gray scale 220. Then in the compensation stage of the display frame F2, a data line electrically connected with the first column of sub-pixels is sequentially input with the first sub-compensation voltage corresponding to the gray scale 120, the first sub-compensation voltage corresponding to the gray scale 150, the first sub-compensation voltage corresponding to the gray scale 60, and the first sub-compensation voltage corresponding to the gray scale 220, and the polarity corresponding to the first sub-compensation voltages input in the data line electrically connected with the first column of sub-pixels in the display frame F2 is opposite to the polarity corresponding to the data voltage input to the first column of sub-pixels in the display frame F2, for example, the first sub-compensation voltages input in the data line both are positive polarity.

In the display frame F1, the data voltage input to the sub-pixels in the first row and second column corresponds to the gray scale 127, the data voltage input to the sub-pixels in the second row and second column corresponds to the gray scale 159, and the data voltage input to the sub-pixels in the third row and second column corresponds to the gray scale 160, and the data voltage input to the sub-pixels in the fourth row and second column corresponds to the gray scale 68. Then in the compensation stage of the display frame F2, a data line electrically connected with the second column of sub-pixels is sequentially input with the first sub-compensation voltage corresponding to the gray scale 127, the first sub-compensation voltage corresponding to the gray scale 159, the first sub-compensation voltage corresponding to the gray scale 160, and the first sub-compensation voltage corresponding to the gray scale 68, and the polarity corresponding to the first sub-compensation voltages input in the data line electrically connected to the second column in the display frame F2 is opposite to the polarity corresponding to the data voltage input to the second column of sub-pixels in the display frame F2, for example, the first sub-compensation voltages input in the data line both are negative polarity.

In the display frame F1, the data voltage input to the sub-pixels in the first row and third column corresponds to the gray scale 140, the data voltage input to the sub-pixels in the second row and third column corresponds to the gray scale 130, and the data voltage input to the sub-pixels in the third row and third column corresponds to the gray scale 40, and the data voltage input to the sub-pixels in the fourth row and third column corresponds to the gray scale 175. Then in the compensation stage of the display frame F2, a data line electrically connected with the third column of sub-pixels is sequentially input with the first sub-compensation voltage corresponding to the gray scale 140, the first sub-compensation voltage corresponding to gray scale 130, the first sub-compensation voltage corresponding to the gray scale 40, and the first sub-compensation voltage corresponding to the gray scale 175, and the polarity corresponding to the first sub-compensation voltages input in the data line electrically connected with the third column in the display frame F2 is opposite to the polarity corresponding to the data voltage input to the third column of sub-pixels in the display frame F2, for example, the first sub-compensation voltages input in the data line both are positive polarity.

In the display frame F1, the data voltage input to the sub-pixels in the first row and fourth column corresponds to the gray scale 177, the data voltage input to the sub-pixels in the second row and fourth column corresponds to the gray scale 129, and the data voltage input to the sub-pixels in the third row and fourth column corresponds to the gray scale 80, and the data voltage input to the sub-pixels in the fourth row and fourth column corresponds to the gray scale 198. Then in the compensation stage of the display frame F2, a data line electrically connected with the fourth column of sub-pixels is sequentially input with the first sub-compensation voltage corresponding to the gray scale 177, the first sub-compensation voltage corresponding to the gray scale 129, the first sub-compensation voltage corresponding to the gray scale 80, and the first sub-compensation voltage corresponding to the gray scale 198, and the polarity corresponding to the first sub-compensation voltages input in the data line electrically connected with the fourth column in the display frame F2 is opposite to the polarity corresponding to the data voltage input to the fourth column of sub-pixels in the display frame F2, for example, the first sub-compensation voltages input in the data line both are negative polarity.

In the embodiments of the present disclosure, the display frame selected from the plurality of display frames may be the set display frame. For example, taking a display panel with four rows of sub-pixels as an example (of course, in practical applications, the number of rows of sub-pixels in a display panel is not only four, which can be determined according to actual applications, and is not limited herein), in combination with FIG. 4A to FIG. 8, in the display frame F2, a gray scale corresponding to a data voltage input in the sub-pixels in the first row to the fourth row in the display frame F2 is selected as the gray scale corresponding to the first sub-compensation voltage input by the data line electrically connected with the sub-pixels. For example, in the display frame F2, the data voltage input to the sub-pixels in the first row and first column corresponds to the gray scale 120, the data voltage input to the sub-pixels in the second row and first column corresponds to the gray scale 150, the data voltage input to the sub-pixels in the third row and first column corresponds to the gray scale 60, and the data voltage input to the sub-pixels in the fourth row and first column corresponds to the gray scale 220. Then in the compensation stage of the display frame F2, a data line electrically connected with the first column of sub-pixels is sequentially input with the first sub-compensation voltage corresponding to of the gray scale 120, the first sub-compensation voltage corresponding to the gray scale 150, the first sub-compensation voltage corresponding to the gray scale 60, and the first sub-compensation voltage corresponding to the gray scale 220, and the polarity corresponding to the first sub-compensation voltages input in the data line electrically connected with the first column in the display frame F2 is opposite to the polarity corresponding to the data voltage input to the first column of sub-pixels in the display frame F2, for example, the first sub-compensation voltages input in the data line both are positive polarity.

In the display frame F2, the data voltage input to the sub-pixels in the first row and second column corresponds to the gray scale 127, the data voltage input to the sub-pixels in the second row and second column corresponds to the gray scale 159, and the data voltage input to the sub-pixels in the third row and second column corresponds to the gray scale 160, and the data voltage input to the sub-pixels in the fourth row and second column corresponds to the gray scale 68. Then in the compensation stage of the display frame F2, a data line electrically connected with the second column of sub-pixels is sequentially input with the first sub-compensation voltage corresponding to the gray scale 127, the first sub-compensation voltage corresponding to the gray scale 159, the first sub-compensation voltage corresponding to the gray scale 160, and the first sub-compensation voltage corresponding to the gray scale 68, and the polarity corresponding to the first sub-compensation voltages input in the data line electrically connected with the second column in the display frame F2 is opposite to the polarity corresponding to the data voltage input to the second column of sub-pixels in the display frame F2, for example, the first sub-compensation voltages input in the data line both are negative polarity.

In the display frame F2, the data voltage input to the sub-pixels in the first row and third column corresponds to the gray scale 140, the data voltage input to the sub-pixels in the second row and third column corresponds to the gray scale 130, and the data voltage input to the sub-pixels in the third row and third column corresponds to the gray scale 40, and the data voltage input to the sub-pixels in the fourth row and third column corresponds to the gray scale 175. Then in the compensation stage of the display frame F2, a data line electrically connected with the third column of sub-pixels is sequentially input with the first sub-compensation voltage corresponding to the gray scale 140, the first sub-compensation voltage corresponding to the gray scale 130, the first sub-compensation voltage corresponding to the gray scale 40, and the first sub-compensation voltage corresponding to the gray scale 175, and the polarity corresponding to the first sub-compensation voltages input in the data line electrically connected with the third column in the display frame F2 is opposite to the polarity corresponding to the data voltage input to the third column of sub-pixels in the display frame F2, for example, the first sub-compensation voltages input in the data line both are positive polarity.

In the display frame F2, the data voltage input to the sub-pixels in the first row and fourth column corresponds to the gray scale 177, the data voltage input to the sub-pixels in the second row and fourth column corresponds to the gray scale 129, and the data voltage input to the sub-pixels in the third row and fourth column corresponds to the gray scale 80, and the data voltage input to the sub-pixels in the fourth row and fourth column corresponds to the gray scale 198. Then in the compensation stage of the display frame F2, a data line electrically connected with the fourth column of sub-pixels is sequentially input with the first sub-compensation voltage corresponding to the gray scale 177, the first sub-compensation voltage corresponding to the gray scale 129, the first sub-compensation voltage corresponding to the gray scale 80, and the first sub-compensation voltage corresponding to the gray scale 198, and the polarity corresponding to the first sub-compensation voltages input in the data line electrically connected with the fourth column in the display frame F2 is opposite to the polarity corresponding to the data voltage input to the fourth column of sub-pixels in the display frame F2, for example, the first sub-compensation voltages input in the data line both are negative polarity.

Embodiments of the present disclosure provide still some methods for driving the display panel, which are modified with respect to the implementation manners in the foregoing embodiments. The following only describes the differences between this embodiment and the above-mentioned embodiments, and the similarities will not be repeated herein.

In the embodiments of the present disclosure, a part of the plurality of continuous display frames is set display frames. Furthermore, among the plurality of continuous display frames, the display frames other than the set display frame are non-set display frames. That is, a part of the plurality of continuous display frames is set display frames, and the rest of the display frames are non-set display frames.

In the embodiments of the present disclosure, non-set display frames include:

in a data refresh phase, a gate-on voltage is loaded to a gate line(s) in the display panel in time division, and a data voltage of a to-be-displayed image is loaded to each data line when the gate-on voltage is loaded to each gate line, so that a corresponding data voltage is input to each sub-pixel; and in a blanking time phase, the gate-off voltage is simultaneously loaded to the gate line(s) in the display panel, and each data line is floated.

It should be noted that the floating connection of each data line in the blanking time phase may mean that no voltage is applied to each data line.

That is, the working process of the data refresh stage in the non-set display frame is basically the same as the working process of the data refresh stage in the set display frame. However, no compensation phase is set in the blanking time phase in the non-set display frame.

Figure 9:
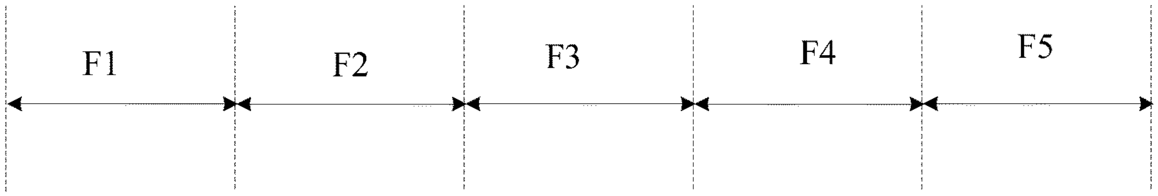
FIG. 9 is another timing diagram of some signals according to an embodiment of the present disclosure.

In the embodiments of the present disclosure, there may be at least one non-set display frame between two adjacent set display frames. For example, there may be a non-set display frame between two adjacent set display frames. It is also possible to have two non-set display frames between two adjacent set display frames. It is also possible to have three non-set display frames between two adjacent set display frames. For example, as shown in FIG. 9, display frame F1, display frame F3, and display frame F5 are set display frames, and display frame F2 and display frame F4 are non-set display frames.

In the embodiments of the present disclosure, the number of non-set display frames between every two adjacent set display frames may be the same. For example, there may be a non-set display frame between every two adjacent set display frames. It is also possible to have two non-set display frames between every two adjacent set display frames. It is also possible to have three non-set display frames between every two adjacent set display frames. For example, as shown in FIG. 9, display frame F1, display frame F3, and display frame F5 are set display frames, and display frame F2 and display frame F4 are non-set display frames.

Embodiments of the present disclosure provide still some methods for driving the display panel, which are modified with respect to the implementation manners in the foregoing embodiments. The following only describes the differences between this embodiment and the above-mentioned embodiments, and the similarities will not be repeated herein.

Figure 10:
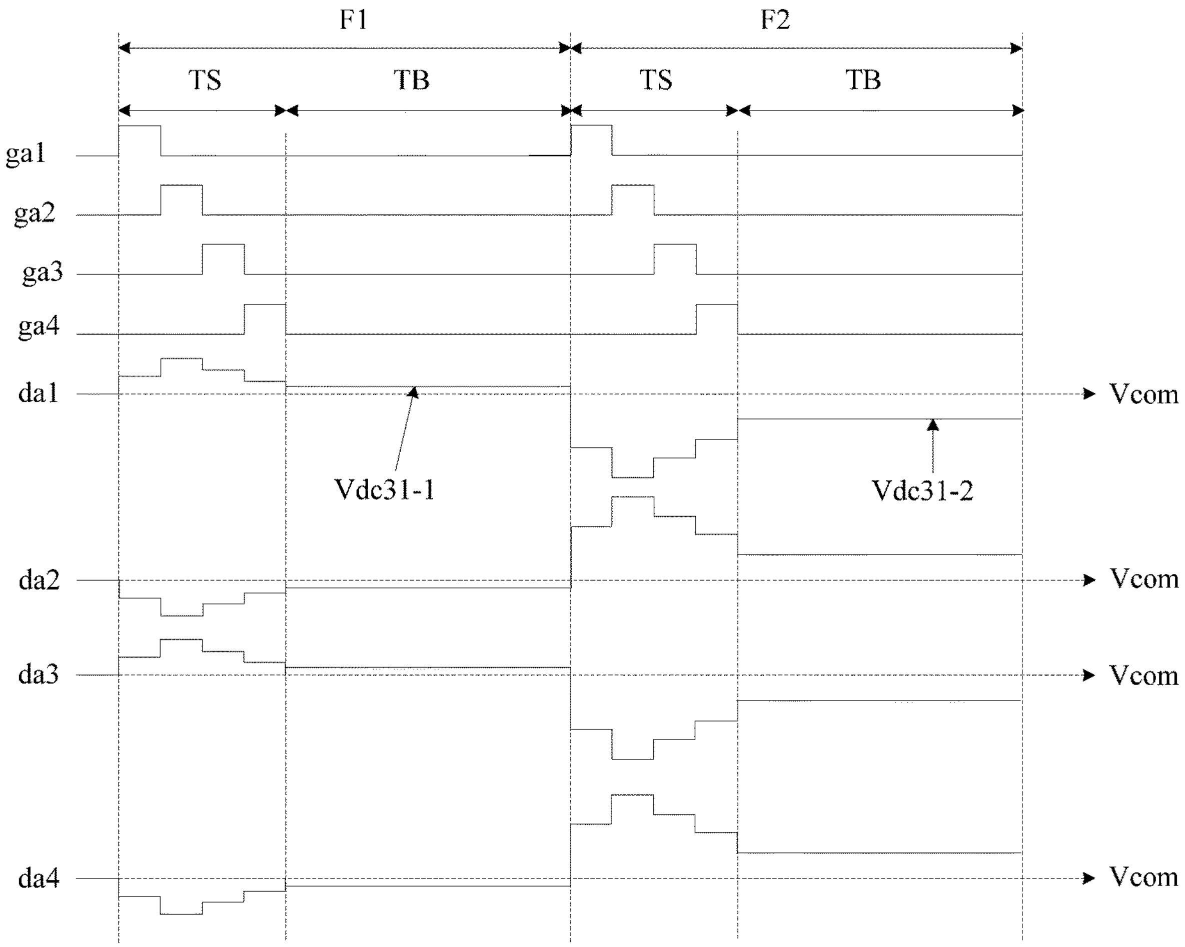
FIG. 10 is another timing diagram of some signals according to an embodiment of the present disclosure.

In the embodiments of the present disclosure, the compensation voltage may include a second sub-compensation voltage; for each data line, the polarity corresponding to the second sub-compensation voltage loaded on the data line is the same as the polarity corresponding to the sub-pixel connected with the data line. For example, as shown in FIG. 4A and FIG. 10, the first sub-pixel column corresponds to a positive polarity, then the polarity corresponding to the second sub-compensation voltage Vdc31-1 that can be loaded to the data line corresponding to the first sub-pixel column is the positive polarity, for example, a voltage can be selected from 8V to 12V and loaded to the data line. The second sub-pixel column corresponds to a negative polarity, then the polarity corresponding to the second sub-compensation voltage that can be loaded to the data line corresponding to the second sub-pixel column is the negative polarity, for example, a voltage can be selected from 4V to 8V and loaded to the data line. The third sub-pixel column corresponds to a positive polarity, then the polarity corresponding to the second sub-compensation voltage that can be loaded to the data line corresponding to the third sub-pixel column is the positive polarity, for example, a voltage can be selected from 8V to 12V and loaded to the data line. The fourth sub-pixel column corresponds to a negative polarity, then the polarity corresponding to the second sub-compensation voltage that can be loaded to the data line corresponding to the fourth sub-pixel column is the negative polarity, for example, a voltage can be selected from 4V to 8V and loaded to the data line.

As shown in FIG. 4B and FIG. 10, the first sub-pixel column corresponds to a negative polarity, then the polarity corresponding to the second sub-compensation voltage Vdc31-2 that can be loaded to the data line corresponding to the first sub-pixel column is the negative polarity, for example, a voltage can be selected from 4V-8V and loaded to the data line. The second sub-pixel column corresponds to a positive polarity, then the polarity corresponding to the second sub-compensation voltage that can be loaded to the data line corresponding to the second sub-pixel column is the positive polarity, for example, a voltage can be selected from 8V to 12V and loaded to the data line. The third sub-pixel column corresponds to a negative polarity, then the polarity corresponding to the second sub-compensation voltage that can be loaded to the data line corresponding to the third sub-pixel column is the negative polarity, for example, a voltage can be selected from 4V to 8V and loaded to the data line. The fourth sub-pixel column corresponds to a positive polarity, then the polarity corresponding to the second sub-compensation voltage that can be loaded to the data line corresponding to the fourth sub-pixel column is the positive polarity, for example, a voltage can be selected from 8V to 12V and loaded to the data line.

Embodiments of the present disclosure provide still some methods for driving the display panel, which are modified with respect to the implementation manners in the foregoing embodiments. The following only describes the differences between this embodiment and the above-mentioned embodiments, and the similarities will not be repeated herein.

Figure 11:
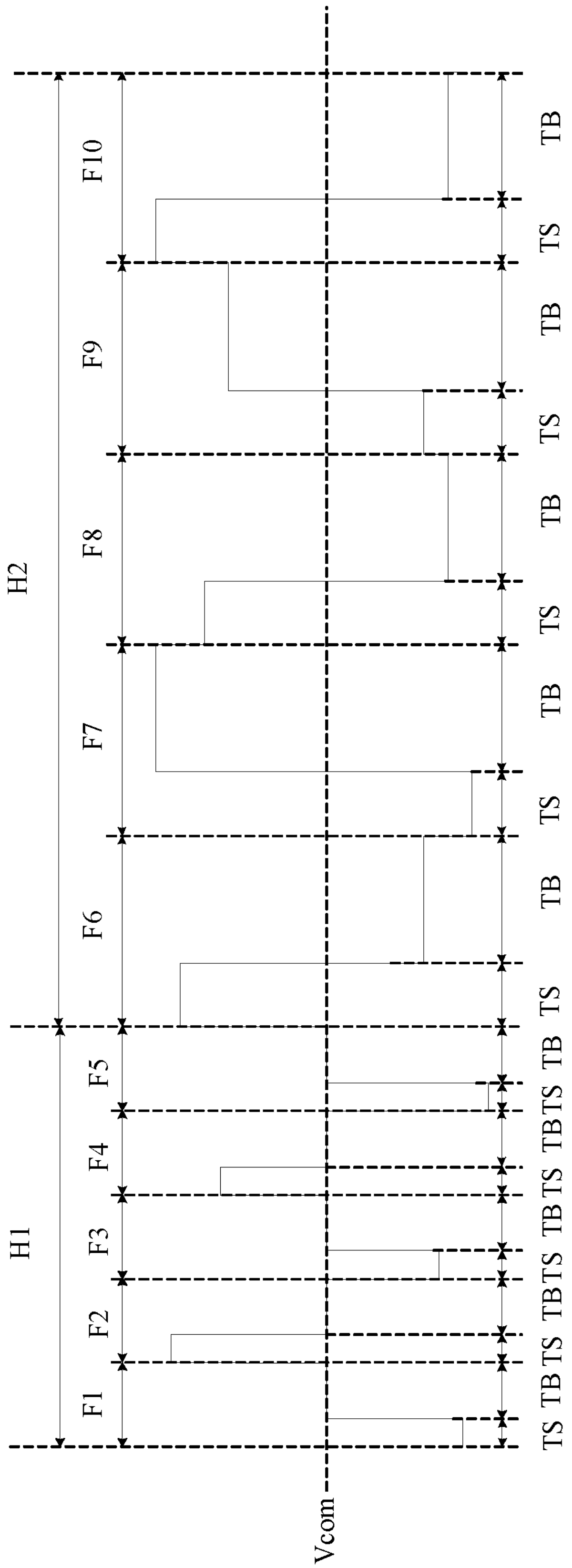
FIG. 11 is another timing diagram of some signals according to an embodiment of the present disclosure.

In the embodiments of the present disclosure, as shown in FIG. 11, when the display frequency is switched from a higher frequency H1 (for example, 120 Hz) to a lower frequency H2 (for example, 60 Hz, 30 Hz, 48 Hz), only the lower frequency H2 can be used on the display, use the driving method in the embodiments of the present disclosure to drive the display panel to display. For example, the maintenance duration of the blanking time phase TB of the display frames F1-F5 is shorter than the maintenance duration of the blanking time phase TB of the display frames F6-F10, the display frames F1-F5 can be used as the first frame, and the display frames F6-F10 can be used as the second frame. When the display is refreshed at 120 Hz, in the display frames F1-F5, the data lines are floating in the blanking time phase TB. When the display is switched from 120 Hz to 48 Hz, and the display frequency is refreshed at 48 Hz, in the blanking time phase TB of each display frame (for example, display frames F6-F10), a gate-off voltage is loaded to a gate line in the display panel, and a compensation voltage is loaded to each data line. In this way, the brightness of the image displayed at low frequency is increased compared with the image displayed at high frequency, the brightness is kept stable, and the display quality and view experience are improved.

Figure 12:
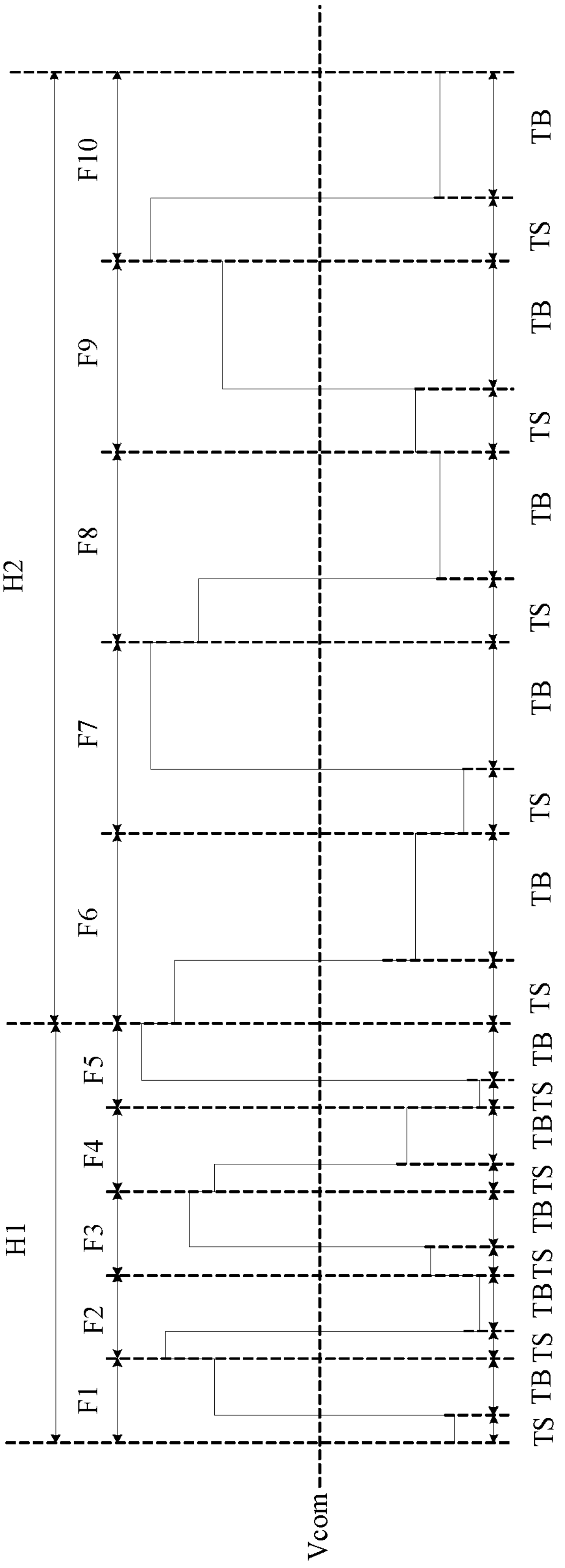
FIG. 12 is another timing diagram of some signals according to an embodiment of the present disclosure.

In the embodiments of the present disclosure, at each display frequency that the display can adopt, as shown in FIG. 12, the driving method in the embodiments of the present disclosure is used to drive the display panel to display at both the higher frequency H1 and the lower frequency H2. For example, the maintenance duration of the blanking time phase TB of the display frames F1-F5 is shorter than the maintenance duration of the blanking time phase TB of the display frames F6-F10, the display frames F1-F5 can be used as the first frame, and the display frames F6-F10 can be used as the second frame. When the display is refreshed at a display frequency of 120 Hz, in the blanking time phase of each display frame (for example, display frames F1 to F5), a gate-off voltage is loaded to a gate line in the display panel, and a compensation voltage is loaded to each data line, that is, display frames F1 to F5 are all refreshed at a display frequency of 120 Hz, and a compensation voltage is loaded to each data line. When the display is switched from 120 Hz to 48 Hz and refreshed at a display frequency of 48 Hz, in the blanking time phase of each display frame (for example, display frames F6-F10), a gate-off voltage is loaded to a gate line in the display panel, and a compensation voltage is loaded to each data line, that is, display frames F6 to F10 are refreshed at a display frequency of 48 Hz, and a compensation voltage is loaded to each data line. In this way, when different display frequencies are refreshed, the compensation voltage can be loaded to the data lines in the blanking time phase, so that compensation is not performed by additionally distinguishing display frequencies. That is, different display frequencies can be uniformly compensated. At this time, the TCON timing is easier to adjust, the TCON timing design is simplified, and the power consumption is reduced. It should be noted that in this case, for the abnormal display that appears when the low-frequency refresh is converted to the high-frequency refresh, the abnormal display is caused by the leakage in the blanking time phase and the insufficient charging at the high refresh rate. Currently, the display tends to have a high refresh rate, such as 144 HZ, 240 Hz, etc. The higher the refresh rate is, the lower the charging rate is, resulting in a decrease in the brightness of the display panel. Insufficient charging rate at the high refresh rate dominates, resulting in lower display brightness at high refresh rate than at low refresh rate. In this way, when the refresh rate is switched, the display will have a difference in brightness and darkness, and the display will be abnormal. In order to simplify the TCON timing adjustment and timing design, a compensation voltage with opposite polarity to that of the data signal can be loaded at both high and low frequencies. At this time, the blanking time phase at a high refresh rate is shorter than that at a low refresh rate. At this time, even if the compensation voltage is increased, the problem of abnormal display screen can still be solved. Of course, in this case, the compensation voltage can only be loaded in the display frame at a low refresh rate, and the blanking time phase is maintained at a high refresh rate, for example, only 0 grayscale voltage is given at this phase. Thus, the brightness at the refresh rate is reduced to match the brightness with high refresh rate, to achieve good display uniformity.

Embodiments of the present disclosure provide still some methods for driving the display panel, which are modified with respect to the implementation manners in the above-mentioned embodiments. The following only describes the differences between this embodiment and the above-mentioned embodiments, and the similarities will not be repeated herein.

When the data voltage in the sub-pixels connected with the data line is higher than the common electrode voltage, the compensation voltage loaded on the data line may also be higher than the data voltage in the sub-pixels connected with the data line. When the data voltage in the sub-pixels connected with the data line is lower than the common electrode voltage, the compensation voltage loaded on the data line may also be lower than the data voltage in the sub-pixels connected with the data line. In this way, the voltage difference between the source and the drain of the transistor in the sub-pixel can be reduced during the blanking time, and the leakage of the transistor can be reduced. In this way, when the display is continuously at a low display frequency, by reducing the leakage of the transistor, the data voltage input to the sub-pixel can be kept stable, thereby avoiding the problem that the brightness of the display screen decreases when the display is continuously at a low display frequency.

Embodiments of the present disclosure further provide a display drive circuit. The display panel works in a plurality of continuous display frames, and each display frame includes a data refresh phase and a blanking time phase; and the display drive circuit is configured for:

- in a data refresh phase of at least one of the plurality of continuous display frames, loading a gate-on voltage to a gate line in the display panel, and loading a data voltage of a to-be-displayed image to each data line, to input a corresponding data voltage to each sub-pixel;
- in a blanking time phase of the at least one display frame, loading a gate-off voltage to the gate line in the display panel, and loading a compensation voltage to each data line; where when the data voltage in the sub-pixel connected with the data line is greater than a common electrode voltage, the compensation voltage loaded on the data line is lower than the data voltage in the sub-pixel connected with the data line; when the data voltage in the sub-pixel connected with the data line is lower than a common electrode voltage, the compensation voltage loaded on the data line is greater than the data voltage in the sub-pixel connected with the data line.

It should be noted that the working principle and specific implementation of the display drive circuit are the same as those of the method for driving the display panel in the above-mentioned embodiments. Therefore, the working method of the display drive circuit can be implemented by referring to the specific implementation manner of the method for driving the display panel in the above-mentioned embodiments, and it will not be repeated herein.

Figure 13:
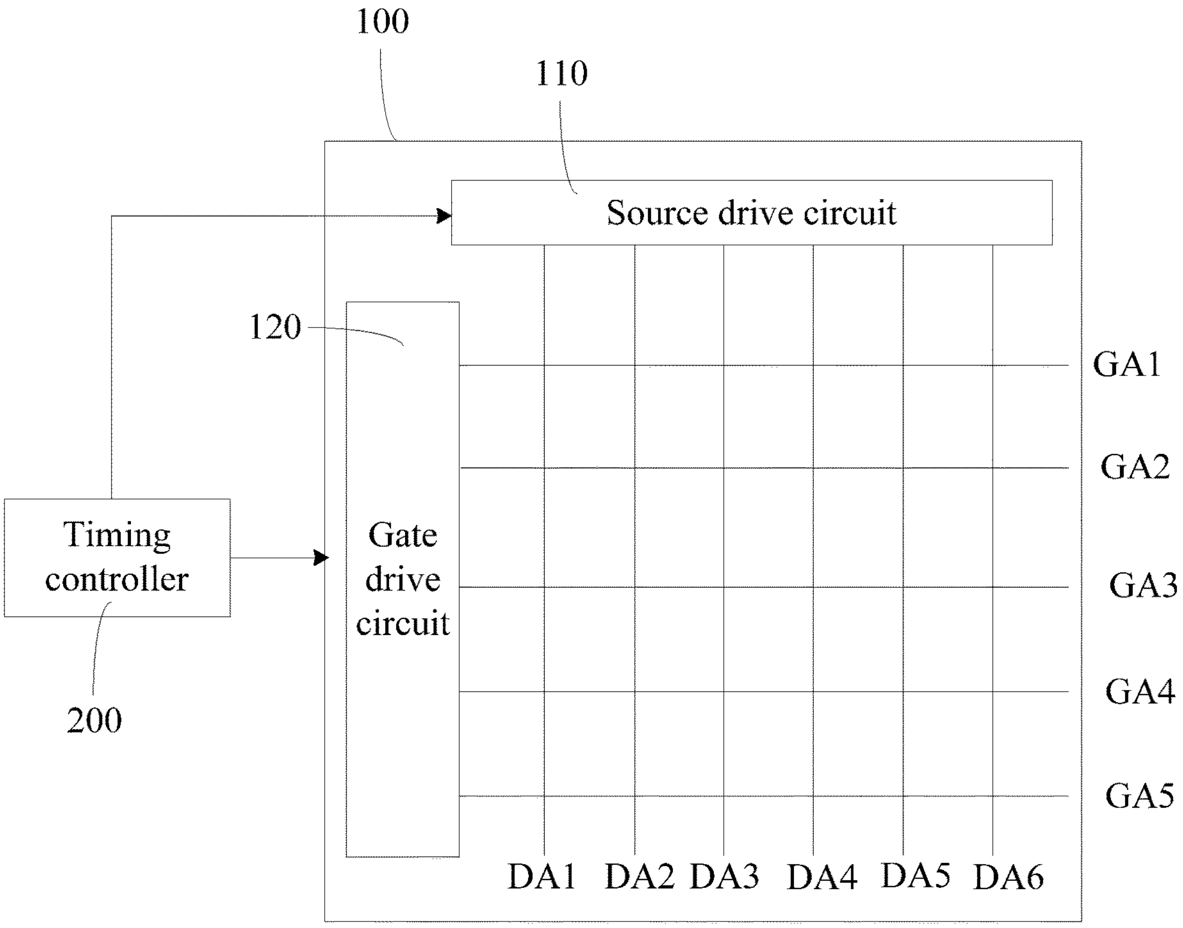
FIG. 13 is some structural schematic diagrams of a display device according to an embodiment of the present disclosure.

Embodiments of the present disclosure further provides a display device, as shown in FIG. 13, including a display panel 100 and a timing controller (TCON) 200; the display panel 100 includes a plurality of gate lines GA1-GA5, a plurality of data lines DA1-DA6, a source drive circuit 110, and a gate drive circuit 120. Here, the source drive circuit 110 is coupled to the plurality of data lines DA1-DA6; and the gate drive circuit 120 is coupled to the plurality of gate lines GA1-GA5.

In the embodiments of the present disclosure, as shown in FIG. 13, the timing controller 200 is coupled to the source drive circuit 110 and the gate drive circuit 120.

The timing controller 200 is configured to: in a data refresh phase of at least one of a plurality of continuous display frames, input a first gate drive signal to the gate drive circuit 120, and input a first source drive signal to the source drive circuit. The gate drive circuit 120 is configured to load a gate-on voltage to gate lines GA1 to GA5 in the display panel 100 according to the received first gate drive signal. The source drive circuit 110 is configured to load a data voltage of a to-be-displayed image to each of the data lines DA1 to DA6 according to the received first source drive signal, so as to realize the image display of one display frame.

The timing controller 200 is configured to: in a blanking time phase of the at least one display frame, input a second gate drive signal to the gate drive circuit 120, and input a second source drive signal to the source drive circuit 110. The gate drive circuit 120 is configured to load a gate-off voltage to the gate lines GA1 to GA5 in the display panel according to the received second gate drive signal. The source drive circuit 110 is configured to load a compensation voltage to each of the data lines DA1 to DA6 according to the received second source drive signal. Here, when the data voltage in the sub-pixel connected with the data line is greater than the common electrode voltage, the compensation voltage loaded on the data line is lower than the data voltage in the sub-pixel connected with the data line; when the data voltage in the sub-pixel connected with the data line is lower than the common electrode voltage, the compensation voltage loaded on the data line is greater than the data voltage in the sub-pixels connected with the data line. Therefore, the problem of increased brightness of the display screen when the display frequency of the display changes from high frequency to low frequency can solve, thereby keeping the brightness stable, and improving display quality and view experience.

It should be noted that the working principle and specific implementation of the display device are the same as those of the method for driving the display panel in the above-mentioned embodiments. Therefore, the working method of the display device can be implemented by referring to the specific implementation manner of the method for driving the display panel in the above-mentioned embodiments, and it will not be repeated herein.

During specific implementation, in the embodiments of the present disclosure, the display device may be any product or component with a display function such as a mobile phone, a tablet computer, a television, a monitor, a notebook computer, a digital photo frame, a navigator, and the like. Other essential components of the display device should be understood by those of ordinary skill in the art, and will not be repeated herein, nor should they be used as limitations on the present disclosure.

In the method for driving the display panel, the display drive circuit, and the display device provided by the embodiments of the present disclosure, in the data refresh phase of a set display frame among the plurality of continuous display frames, a gate-on voltage is time-divisionally loaded on a gate line in the display panel, and when the gate-on voltage is loaded to each gate line, a data voltage of a to-be-displayed image is loaded to each data line, so that the corresponding data voltage is input to each sub-pixel, so as to realize the image display of one display frame. Moreover, in the blanking time phase of the set display frame, the gate-off voltage is simultaneously loaded to the gate lines in the display panel, and the compensation voltage is loaded to each data line. As such, the voltage difference between the source and the drain of the transistor in the blanking time phase can reduce, thereby reducing the leakage of the sub-pixel and improving the display quality and view experience.

Those skilled in the art should understand that the embodiments of the present disclosure may be provided as a method, a system, or a computer program product. Accordingly, the present disclosure can take the form of an entirely hardware embodiment, an entirely software embodiment, or an embodiment combining software and hardware aspects. Furthermore, the present disclosure may take the form of a computer program product embodied on one or more computer-usable storage media (including but not limited to a disk storage, a CD-ROM, an optical storage, etc.) having an computer-usable program code embodied therein.

The present disclosure is described with reference to flowchart illustrations and/or block diagrams of methods, apparatus (systems), and computer program products according to embodiments of the disclosure. It should be understood that each procedure and/or block in the flowchart and/or block diagram, and a combination of procedures and/or blocks in the flowchart and/or block diagram can be realized by computer program instructions. These computer program instructions may be provided to a general purpose computer, a special purpose computer, an embedded processor, or a processor of other programmable data processing equipment to produce a machine such that the instructions executed by the processor of the computer or other programmable data processing equipment produce a an apparatus for realizing the functions specified in one or more procedures of the flowchart and/or one or more blocks of the block diagram.

These computer program instructions may also be stored in a computer-readable memory capable of directing a computer or other programmable data processing apparatus to operate in a specific manner, such that the instructions stored in the computer-readable memory produce an article of manufacture including instruction devices, the instruction device realizes the function specified in one or more procedures of the flowchart and/or one or more blocks of the block diagram.

These computer program instructions can also be loaded onto a computer or other programmable data processing device, causing a series of operational steps to be performed on the computer or other programmable device to produce a computer-implemented process, thus the instructions provide steps for implementing the functions specified in the flow chart or blocks of the flowchart and/or the block or blocks of the block diagrams.

While preferred embodiments of the disclosure have been described, additional changes and modifications to these embodiments can be made by those skilled in the art once the basic inventive concept is appreciated. Therefore, it is intended that the appended claims be construed to cover the preferred embodiment as well as all changes and modifications which fall within the scope of the disclosure.

Apparently, those skilled in the art can make various changes and modifications to the embodiments of the present disclosure without departing from the spirit and scope of the embodiments of the present disclosure. In this way, if the modifications and variations of the embodiments of the present disclosure fall within the scope of the claims of the present disclosure and equivalent technologies, the present disclosure also intends to include these modifications and variations.

What is claimed is:

1. A method for driving a display panel, wherein the display panel works in a plurality of continuous display frames, and each display frame comprises a data refresh phase and a blanking time phase; and the method comprises:

in the data refresh phase of at least one of the plurality of continuous display frames, loading a gate-on voltage to a gate line in the display panel, and loading a data voltage of a to-be-displayed image to each data line, to input a corresponding data voltage to each sub-pixel; and in the blanking time phase of the at least one of the plurality of continuous display frames, loading a gate-off voltage to the gate line in the display panel, and loading a compensation voltage to each data line;

wherein when the data voltage in the sub-pixel connected with the data line is greater than a common electrode voltage, the compensation voltage loaded on the data line is lower than the data voltage in the sub-pixel connected with the data line; and/or when the data voltage in the sub-pixel connected with the data line is lower than a common electrode voltage, the compensation voltage loaded on the data line is greater than the data voltage in the sub-pixel connected with the data line;

wherein the display frame, in which the compensation voltage is loaded to each data line in the blanking time phase, is defined as a set display frame;

part of the plurality of continuous display frames are set display frames;

display frames other than the set display frames among the plurality of continuous display frames are non-set display frames;

the non-set display frames comprise:

in the data refresh phase, loading the gate-on voltage to the gate line in the display panel, and loading the data voltage of the to-be-displayed image to each data line, to input the corresponding data voltage to each sub-pixel; and in the blanking time phase, loading the gate-off voltage to the gate line in the display panel, to enable each data line to be in a suspension joint state.

2. The method for driving the display panel according to claim 1, wherein the compensation voltage is loaded throughout the blanking time phase of the at least one of the plurality of continuous display frames.

3. The method for driving the display panel according to claim 1, wherein at least one non-set display frame exists between two adjacent set display frames.

4. The method for driving the display panel according to claim 3, wherein a quantity of the non-set display frames between every two adjacent set display frames is the same.

5. The method for driving the display panel according to claim 1, wherein a gray scale corresponding to the compensation voltage loaded on each data line is the same.

6. The method for driving the display panel according to claim 5, wherein, for each data line, the gray scale corresponding to the compensation voltage loaded on the data line is the same as a gray scale corresponding to one data voltage of the sub-pixel connected with the data line.

7. The method for driving the display panel according to claim 6, wherein the gray scale corresponding to the compensation voltage is determined by using following formula:

$$VS11=(VA11+VA12)/2;$$

wherein, VS11 represents the gray scale corresponding to the compensation voltage, VA11 represents a maximum gray scale in a display frame selected from the plurality of continuous display frames, VA12 represents a minimum gray scale in the display frame selected from the plurality of continuous display frames, and VA11+VA12 is an even number.

8. The method for driving the display panel according to claim 6, wherein the gray scale corresponding to the compensation voltage is determined by using following formula:

$$VS21=(VA21+VA22+1)/2;$$

wherein, VS21 represents the gray scale corresponding to the compensation voltage, VA21 represents a maximum gray scale in a display frame selected from the plurality of continuous display frames, VA22 represents a minimum gray scale in the display frame selected from the plurality of continuous display frames, and VA21+VA22 is an odd number.

9. The method for driving the display panel according to claim 8, wherein the display frame selected from the plurality of display frames is one of a previous display frame adjacent to a set display frame and the set display frame.

10. The method for driving the display panel according to claim 1, wherein the loading the compensation voltage to each data line, comprises:

in a blanking time phase of a set display frame, selecting a display frame from the plurality of display frames, and for each data line, loading a voltage of a gray scale, corresponding to a data voltage input into a row of sub-pixels of the display panel in the selected display frame, to the data line.

11. The method for driving the display panel according to claim 1, wherein the loading the compensation voltage to each data line, comprises:

in a blanking time phase of a set display frame, selecting a display frame from the plurality of display frames, and for each data line, loading a voltage of a gray scale, corresponding to a data voltage input into a last row of sub-pixels of the display panel in the selected display frame, to the data line.

12. The method for driving the display panel according to claim 1, wherein the loading the compensation voltage to each data line, comprises:

in a blanking time phase of a set display frame, selecting a display frame from the plurality of display frames, and for each data line, sequentially loading a voltage of a gray scale, corresponding to a data voltage input into the data line in the selected display frame, to the data line.

13. The method for driving the display panel according to claim 1, wherein the display panel adopts a column inversion method or a frame inversion method; the compensation voltage comprises a second sub-compensation voltage;

for each data line, a polarity corresponding to the second sub-compensation voltage loaded on the data line is the same as a polarity corresponding to the data voltage in the sub-pixel connected with the data line.

14. The method for driving the display panel according to claim 1, wherein the display panel adopts a column inversion method or a frame inversion method; the compensation voltage comprises a first sub-compensation voltage;

for each data line, a polarity corresponding to the first sub-compensation voltage loaded on the data line is opposite to a polarity corresponding to the sub-pixel connected with the data line.

15. The method for driving the display panel according to claim 14, wherein the display frame, in which the compensation voltage is loaded to each data line in the blanking time phase, has a first display frame and a second display frame;

the first display frame corresponds to a first refresh rate, and the second display frame corresponds to a second refresh rate; and the first refresh rate is greater than the second refresh rate; and a duration of the blanking time phase in the first display frame is shorter than a duration of the blanking time phase in the second display frame.

16. The method for driving the display panel according to claim 14, wherein the display frame, in which the compensation voltage is loaded to each data line in the blanking time phase, is defined as a set display frame; in two adjacent set display frames, for a same data line, the first sub-compensation voltage loaded to the data line in a previous set display frame and the common electrode voltage have a first difference therebetween, and the first sub-compensation voltage loaded to the data line in a next set display frame and the common electrode voltage have a second difference therebetween; and an absolute value of the first difference is equal to an absolute value of the second difference.

17. The method for driving the display panel according to claim 14, wherein the compensation voltage further comprises a transition compensation voltage that appears before the first sub-compensation voltage;

for each data line, a polarity corresponding to the transition compensation voltage loaded on the data line is the same as the polarity corresponding to the sub-pixel connected with the data line.

* * * * *